United States Patent
Kasravi et al.

[11] Patent Number: 5,933,818
[45] Date of Patent: Aug. 3, 1999

[54] AUTONOMOUS KNOWLEDGE DISCOVERY SYSTEM AND METHOD

[75] Inventors: Kasra Kasravi, Bloomfield Hills; Mary K. Schleusener, Fenton; Barry F. Haun, Auburn Hills, all of Mich.

[73] Assignee: Electronic Data Systems Corporation, Plano, Tex.

[21] Appl. No.: 08/869,281

[22] Filed: Jun. 2, 1997

[51] Int. Cl.[6] .............................. G06F 15/18; G06F 9/44
[52] U.S. Cl. .............................. 706/12; 706/13; 706/45; 707/104
[58] Field of Search .................. 706/10, 3, 60, 706/900, 12, 13, 45; 382/226; 707/6, 104

[56] References Cited

U.S. PATENT DOCUMENTS

| | | | |
|---|---|---|---|
| 5,311,562 | 5/1994 | Palusamy et al. | 376/215 |
| 5,341,142 | 8/1994 | Reis et al. | 342/64 |
| 5,388,189 | 2/1995 | Kung | 706/45 |
| 5,566,092 | 10/1996 | Wang et al. | 364/131 |
| 5,579,444 | 11/1996 | Dalziel et al. | 395/94 |
| 5,634,053 | 5/1997 | Noble et al. | 707/4 |
| 5,692,107 | 11/1997 | Simoudis et al. | 706/45 |

OTHER PUBLICATIONS

M.J.A. Berry and G. Linoff, Data Mining Techniques: For Marketing, Sales, and Customer Support, John Wiley & Sons, Inc., pp. 200–203, May 1997.

*Primary Examiner*—Robert W. Downs
*Attorney, Agent, or Firm*—L. Joy Griebenow; Baker & Botts L.L.P.

[57] ABSTRACT

A knowlege discovery system (10) is provided for autonomously discovering knowlege from a database. The system includes a data reduction module (50) which reduces data into one or more clusters. This is accomplished by the use of one or more functions including a genetic clustering function, a hierarchical valley formation function, a symbolic exspansion reduction function, a fuzzy case clustering function, a relational clustering function, a K-means clustering function, a Kohonen neural network clustering function, and a minimum distance classifier clustering function. A data analysis modual (60) autonomously determines one or more correlations among the clusters. The corrolations represent knowlege.

60 Claims, 11 Drawing Sheets

| RECORDS, N | FIELDS, F | | | | |
|---|---|---|---|---|---|
| | 20 | 100 | 500 | 1000 | 2000 |
| 1 | 1 | 1 | 1 | 1 | 1 |
| 5 | 3 | 2 | 2 | 2 | 2 |
| 10 | 4 | 4 | 4 | 4 | 4 |
| 50 | 6 | 8 | 12 | 14 | 16 |
| 100 | 7 | 11 | 18 | 22 | 27 |
| 500 | 10 | 20 | 39 | 52 | 70 |
| 1000 | 12 | 24 | 51 | 71 | 98 |
| 5000 | 15 | 36 | 89 | 132 | 195 |
| 10000 | 17 | 42 | 110 | 167 | 253 |
| 50000 | 20 | 58 | 170 | 270 | 429 |
| 100000 | 22 | 66 | 200 | 325 | 527 |
| 500000 | 26 | 85 | 285 | 480 | 810 |
| 1000000 | 28 | 94 | 327 | 560 | 960 |
| 5000000 | 32 | 117 | 440 | 780 | 1381 |
| 10000000 | 34 | 128 | 496 | 889 | 1597 |
| 50000000 | 38 | 155 | 640 | 1183 | 2186 |
| 1E+08 | 40 | 167 | 710 | 1327 | 2481 |

| RECORD | YEAR | BODY | PRICE | COLOR | TPW |
|---|---|---|---|---|---|
| 1 | 1995 | SKI | 35000 | RED | 1100 |
| 2 | 1994 | PONTOON | 12000 | BLUE | 2850 |
| 3 | 1993 | FISHING | 23000 | BLUE | 2100 |
| 4 | 1995 | SKI | 32000 | RED | 1600 |
| 5 | 1994 | SKI | 28000 | RED | 1550 |
| 6 | 1994 | FISHING | 19000 | RED | 1950 |
| 7 | 1993 | PONTOON | 17000 | BLUE | 2750 |
| 8 | 1995 | FISHING | 26000 | BLUE | 1900 |
| 9 | 1994 | SKI | 65000 | GREEN | 1500 |
| 10 | 1993 | PONTOON | 14000 | RED | 2400 |
| 11 | 1993 | FISHING | 21000 | BLUE | 2050 |
| 12 | 1995 | FISHING | 22000 | GREEN | 1800 |
| 13 | 1994 | SKI | 43000 | GREEN | 1900 |
| 14 | 1993 | PONTOON | 16000 | BLUE | 3000 |
| 15 | 1995 | PONTOON | 15000 | GREEN | 2950 |
| 16 | 1993 | FISHING | 19500 | BLUE | 2000 |
| 17 | 1994 | SKI | 38500 | RED | 1350 |
| 18 | 1995 | FISHING | 23000 | RED | 2025 |
| 19 | 1993 | SKI | 31000 | GREEN | 1450 |

*FIG. 12*

| RECORD | PRICE | TPW |
|---|---|---|
| 1 | 35000 | 1100 |
| 2 | 12000 | 2850 |
| 3 | 23000 | 2100 |
| 4 | 32000 | 1600 |
| 5 | 28000 | 1550 |
| 6 | 19000 | 1950 |
| 7 | 17000 | 2750 |
| 8 | 26000 | 1900 |
| 9 | 65000 | 1500 |
| 10 | 14000 | 2400 |
| 11 | 21000 | 2050 |
| 12 | 22000 | 1800 |
| 13 | 43000 | 1900 |
| 14 | 16000 | 3000 |
| 15 | 15000 | 2950 |
| 16 | 19500 | 2000 |
| 17 | 38500 | 1350 |
| 18 | 23000 | 2025 |
| 19 | 31000 | 1450 |

*FIG. 13*

| RECORD | BODY | COLOR |
|---|---|---|
| 1 | SKI | RED |
| 2 | PONTOON | BLUE |
| 3 | FISHING | BLUE |
| 4 | SKI | RED |
| 5 | SKI | RED |
| 6 | FISHING | RED |
| 7 | PONTOON | BLUE |
| 8 | FISHING | BLUE |
| 9 | SKI | GREEN |
| 10 | PONTOON | RED |
| 11 | FISHING | BLUE |
| 12 | FISHING | GREEN |
| 13 | SKI | GREEN |
| 14 | PONTOON | BLUE |
| 15 | PONTOON | GREEN |
| 16 | FISHING | BLUE |
| 17 | SKI | RED |
| 18 | FISHING | RED |
| 19 | SKI | GREEN |

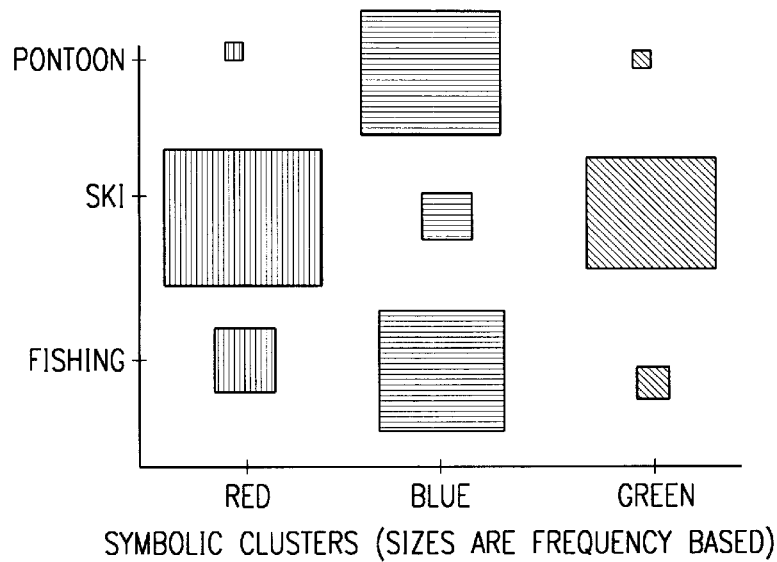
FIG. 16
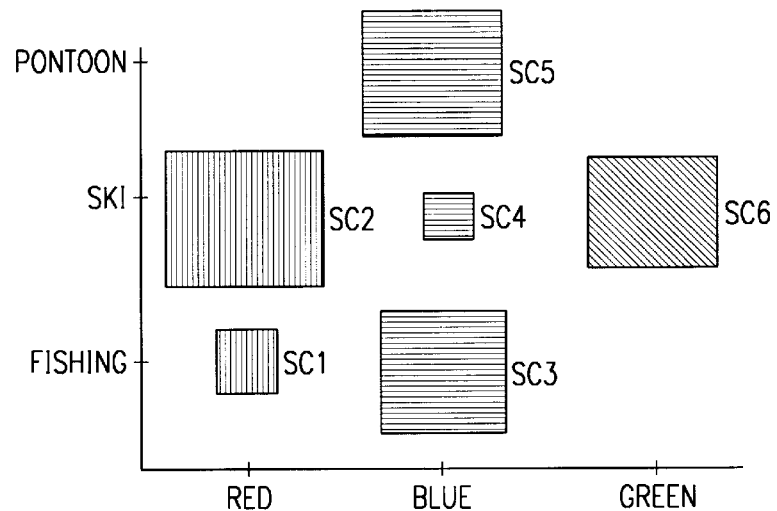
FIG. 17
|  | SC1 | SC2 | SC3 | SC4 | SC5 | SC6 |
|---|---|---|---|---|---|---|
| NC1 | 15 | 95 | 12 | 35 | 5 | 35 |
| NC2 | 55 | 30 | 85 | 70 | 20 | 80 |
| NC3 | 20 | 5 | 25 | 25 | 95 | 25 |
FIG. 18

AUTONOMOUS KNOWLEDGE DISCOVERY SYSTEM AND METHOD

TECHNICAL FIELD OF THE INVENTION

This invention generally relates to the field of data analysis and, more particularly, to an autonomous knowledge discovery system and method.

BACKGROUND OF THE INVENTION

Advancements in technology have reduced the cost of computers to the point where many events in one's day are recorded by a computer. Events recorded by computer are numerous and include, for example, every transaction made by an individual. Computers store the data associated with the transactions they process resulting in very large databases of information. Also, companies and individuals frequently use computers to record events related to a specific domain. For example, a meteorologist may enter into a computer database many records of data relating to weather occurrences.

The problem, therefore, arises of how to make efficient use of the tremendous amount of information in these databases. When the number of records in a database rises to a certain level, simply sorting the information in the database provides no meaningful results. While statistical analysis of the records in a database may yield useful information, such analysis must generally be performed by persons with advanced training in math or computer science. Typically, these people are also needed to understand the results of the analyses. Additionally, translation of the statistical analysis of the information in a large database into a useful form is also difficult. For example, a strategic business activity such as marketing may require analytical information to be converted into a form specifically suited to the activity of marketing. Difficulties in providing or obtaining information in a useful form may prevent the effective use of the information in a database and preclude the use of a possibly valuable data resource.

Organizations of all types commonly collect and store business and technical data in various types of databases. Strategic and/or technical knowledge may be contained in the databases. In some instances, based on many years of experience, experts are able to glean knowledge from databases existing in their particular domain of expertise. In the absence of such experts, however, strategically useful information may not be available to the organization controlling or accessing a given database. The inability to obtain this knowledge may be detrimental to the business objectives of the organization. For example, if a business cannot extract useful knowledge from the data it possesses, it will likely be at a competitive disadvantage compared to a business that can discover such knowledge. Thus, the ability to discover knowledge from data contained in databases would be a valuable asset to any organization.

Certain tools are available which assist a nonexpert to gain some knowledge from a database. For example, some data analysis tools respond to queries input by the user. A query might be: "How many people within the database are within a certain age range." The data analysis tool looks to all the records in which an age field meets the age range requirement of the query. Then, the tool simply counts the number of records. Query tools require the user to have an extensive knowledge of the database domain and the queries generally are very rigid in their structure. Thus, query tools are very limited in their ability to enable a user to analyze data.

One improvement of query tools is the development of data mining tools. Such tools, however, still require the user to have prior knowledge of the domain of the database. Also, such tools generally require the user to input one or more hypotheses, assumptions or goals in connection with analyzing the database to determine knowledge. For instance, a retail data mining tool might be used to analyze a retail database to determine the concept: "Diapers and beer are generally purchased at the same time." This knowledge would be useful to retail executives who plan marketing strategies. However, typical data mining tools require a user to first propose one or more hypotheses in connection with the data. One hypothesis in this example might be that products are purchased together. Another hypothesis might be that something is purchased together with diapers. For instance, a user would likely have to select a first product (e.g., diapers) from many products contained in the database. Then, the user would have to make the assumption that a second product was purchased, and that it was purchased at the same time as the first product. Alternatively, the user might begin with the first product and then ask the database how often the second product was purchased at the same time. Each of these assumptions requires that the user of the data mining tool have prior knowledge of the retail domain and of the particular database being analyzed.

Data mining can also be performed based on goals. In connection with the previous example, a goal that would be input by a user might be: "Improve sales of beer." With that goal "in mind" the data mining tool might respond by offering: "Position the beer adjacent the diapers." The development of goals, however, also requires prior knowledge of the domain and the database, and the formation of intelligent input by the user. Thus, known data analysis tools cannot autonomously discover knowledge within a database.

The aforementioned problems are not intended to be exhaustive. They are merely examples. Those having ordinary skill in the data analysis art will appreciate that there are other problems associated with known data analysis tools.

SUMMARY OF THE INVENTION

In accordance with the present invention, a knowledge discovery system and method are provided that substantially eliminate or reduce disadvantages and problems associated with previously developed data analysis tools.

It is an object of the present invention to solve those problems associated with known data analysis tools.

It is a further object to provide a knowledge discovery system which autonomously discovers correlations among data. The correlations are preferably multidimensional and constitute relationships among multiple fields within a database.

It is a further object to provide a knowledge discovery system which autonomously discovers knowledge from a database without first requiring the preconception of a user. The user is not required to have prior knowledge of the domain or subject matter of the database. The user is not required to formulate hypotheses or goals, or to make assumptions, relating to the database and the knowledge to be discovered.

It is a further object to provide a knowledge discovery system which autonomously analyzes data from a database by reducing the data into clusters. Each cluster may be analyzed to determine a concept. The concepts can be based on one or more parameters.

To achieve these and other objects of the present invention, and in accordance with one embodiment, an autonomous knowledge discovery system is provided having a database. The system also includes a database interface for accessing the data within the database. The system further includes a data reduction module for autonomously reducing the data into at least one group based on a plurality of parameters. The system further includes a data analysis module for analyzing the at least one group to determine a correlation among the data.

According to a feature of this embodiment, the data reduction module autonomously reduces the data into the at least one group. This is accomplished without input from a user. One or more data reduction methods may be incorporated into the data reduction module. These may include such methods as genetic clustering, hierarchical valley formation, K-means clustering, Kohonen neural network clustering, minimum distance classifier clustering, categorization, or other data reduction methods. The data reduction module may also incorporate one or more tools for enabling data reduction of different types of data. For instance, a symbolic expansion reduction tool may be used to enable one or more clustering methods to operate on discrete, nonnumerical data. Fuzzy case clustering and relational clustering also enable clustering of data in symbolic form. According to another feature, the knowledge discovery system may further include an expert system for automatically selecting, initializing and/or changing the one or more data reduction methods used by the data reduction module. According to another feature the data reduction module may incorporate one or more tools for estimating the number of clusters in a data set.

According to one aspect, the data reduction method requires one or more initial conditions. The knowledge discovery system may further include an expert system to automatically select and/or set the initial conditions. According to an alternative aspect, the data reduction method may autonomously reduce the data into the at least one group without the setting of initial conditions and independent of the preconception of a user.

In accordance with another embodiment, a method is provided for analyzing data. In a first step the data is accessed from, for example, a database. In a second step, the data is passed through a data reduction module which autonomously reduces the data into at least one group based on a plurality of parameters of the data. In a third step a correlation is determined between at least two of the plurality of parameters.

In accordance with another embodiment, a knowledge discovery system includes a database. A data reduction module is coupled to the database. The data reduction module autonomously reduces the data into at least one group by using one or more clustering methods. The data reduction module also uses symbolic expansion reduction to numerically represent nonnumerical data in the database. Alternatively, fuzzy case clustering may be used to temporarily convert numerical and/or symbolic fields to discrete numerical representations for clustering purposes, and then convert the representations back to their original form for subsequent analysis. Alternatively, relational clustering may be used to provide clusters which are defined as paired numerical clusters and symbolic clusters, with each pair having an associated degree of confidence.

In another embodiment a data reduction module is provided for autonomously reducing data from a database into at least one group based on at least one parameter. The module employs at least one data reduction function to reduce the data. The at least one data reduction function may comprise any of the above described data reduction functions.

In accordance with another embodiment, a knowledge fat discovery system includes a database. A data reduction module is coupled to the database. The data reduction module autonomously reduces the data into at least one group by using a combination of at least two of a plurality of available clustering methods. The combination is autonomously selected based a plurality of parameters of the data.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 12 is a table depicting a database for use in connection with a relational clustering function in accordance with an embodiment of the present invention;

FIGS. 13 and 14 are tables depicting the operation of a relational clustering function in accordance with an embodiment of the present invention;

FIGS. 15, 16 and 17 are graphical displays of the clustering results of a relational clustering function in accordance with an embodiment of the present invention; and FIG. 18 is a table depicting cluster relational factors generated by a relational clustering function in accordance with an embodiment of the present invention.

DETAILED DESCRIPTION OF THE INVENTION

The present invention relates to an autonomous knowledge discovery system. The system is a knowledge discovery tool as opposed to a data mining tool. Thus, the system allows a user having no particular knowledge of the domain of a database to analyze the database to discover useful knowledge therefrom. The user is not required to generate hypotheses regarding relationships among the data and is not required to input parameters (e.g., assumptions) into the system as a basis for discovering knowledge from the database.

In general, the knowledge discovery system of the present invention uses artificial intelligence and statistical techniques to autonomously discover previously unknown correlations and concepts. These correlations and concepts can be buried in relatively large volumes of data. For example, a retail database may contain among its data the unknown concept: "Greeting cards and cosmetics are generally purchased at the same time." A data mining tool might generate this concept based on input from the user consisting of one or more hypotheses and assumptions. The knowledge discovery system of the present invention does not require user input and autonomously discovers the concept by identifying supporting correlations among the data. The system has applications in any market in which action is taken based on data. These include, for example, retail, manufacturing, engineering, medical, financial, insurance, pharmaceutical, military, research, meteorological and law enforcement markets.

Figure 1:
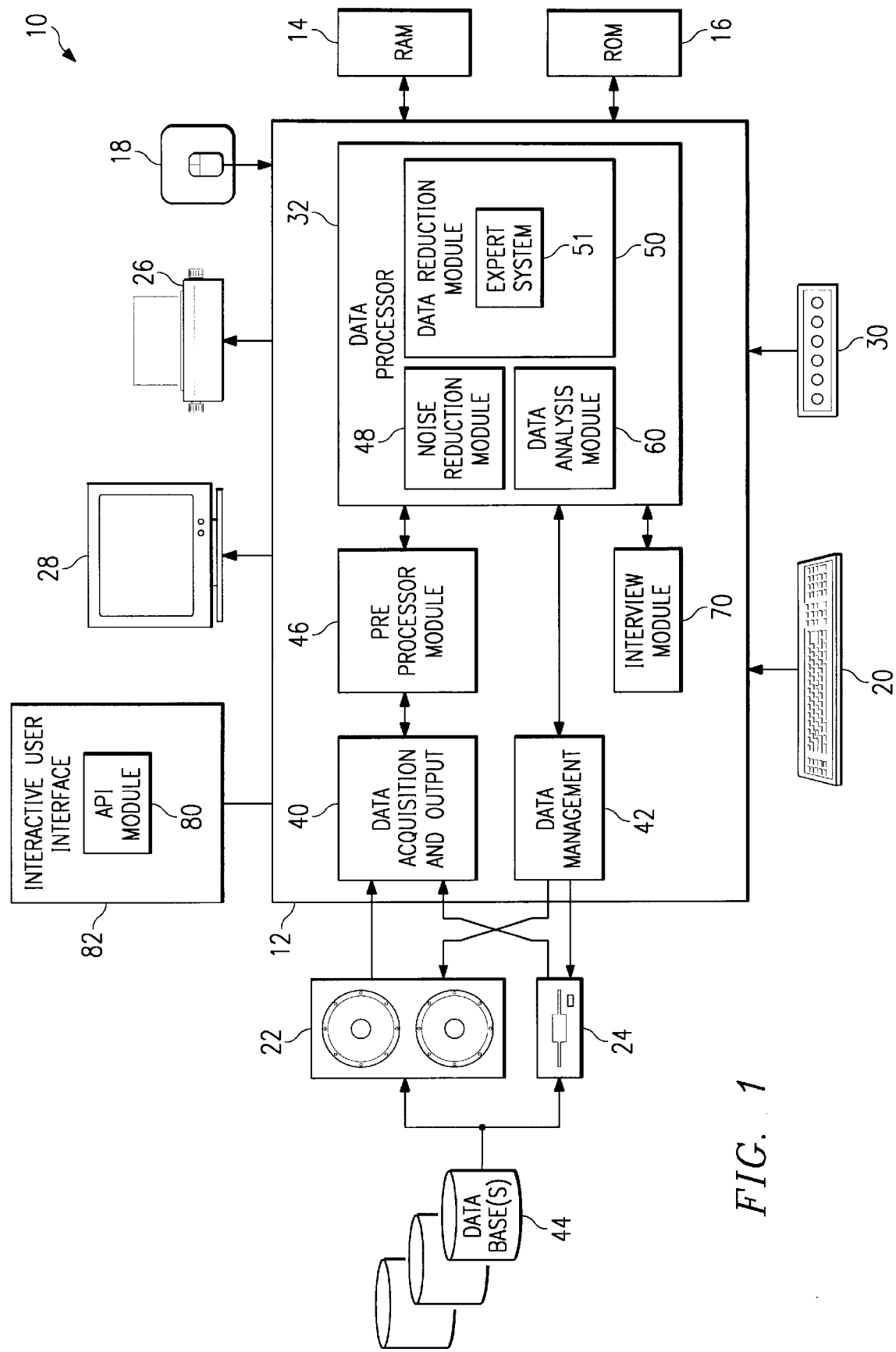
FIG. 1 is a knowledge discovery system in accordance with an embodiment of the present invention.

An autonomous knowledge discovery system in accordance with a first embodiment of the present invention is shown in greater detail in FIG. 1. System 10 preferably includes processor 12, random access memory (RAM) 14, read only memory (ROM) 16, pointing device 18, keyboard 20, and various output devices. The output devices for system 10 may include, for example, external memory devices such as tape drive 22 and disk drives 24, printer 26, and display 28. Autonomous knowledge discovery system 10 also preferably includes modem 30 for making connections to external communication media. System 10 may also incorporate other types of connectivity, such as a LAN connection. Processor 12 in system 10 is adapted to execute many types of computer instructions in many computer languages for implementing the functions available within system 10.

Autonomous knowledge discovery system 10 preferably operates in a parallel supercomputer environment. For example, a Cray T3-E™ supercomputer may be used. A parallel supercomputer is preferable due to the computation-intensive and NP-Complete nature of most of the clustering methods of system 10. However, for some applications, a mainframe or PC environment might be sufficient. The particular computer platform used will depend upon a variety of factors including the volume and type of data within the database.

Autonomous knowledge discovery system 10 may operate in a PC/Windows™ environment. Alternatively, system 10 may operate in an HP 9000™ environment. Other suitable platforms include such UNIX platforms as RS 6000™, Sun™, SG™, Mac™ and OS/2™. These are provided as examples only, however, and the present invention is not intended to be limited to any particular hardware embodiment and may be implemented in one or more computer systems.

With respect to software, system 10 preferably incorporates standard ANSI C++ which provides portability across multiple platforms. Visual Basic™ can be used to create a graphical user interface. The available software for running system 10 is not limited to these examples, and other software products may be used.

Autonomous knowledge discovery system 10 provides significant benefits with its capability to identify complex patterns and relationships within large quantities of information. To that end, system 10 includes several functions which are incorporated into one or more modules.

Preferably, within processor 12, system 10 includes a data interface module 40, which includes a data acquisition and output function. The data acquisition and output function is responsible for receiving data from database(s) 44 and formatting the data for processing by data processor 32. In one embodiment of the present invention, the data acquisition and output function receives customer data in a flat ASCII format from database(s) 44 and converts it into a concise internal binary form for use by data processor 32.

Autonomous knowledge discovery system 10 provides an advanced data analysis tool for analyzing databases containing many different types of data. Although system 10 may be used for analysis of databases containing a variety of information, system 10 has been successfully implemented in analyzing Open Database Connectivity-standard ("ODBC") databases. Other database types which may be supported include, for example, Oracle™, Sybase™, Microsoft SQL/Server™, DB2™, VSAM™, IMS™, RMS™, Rdb™, Allbase™, Informix™ and sequential databases. Such database types may be accessed, for example, via ODBC or flat files. These database types are provided as examples only and other database types may be used in connection with the present invention.

Autonomous knowledge discovery system 10 may be used to analyze databases of information of many domains and formats and is not limited to any particular database content. System 10 provides a benefit, for example, in analyzing customer databases that include information on the types of products purchased, frequency of purchase, quantity of purchase, and other general information on customers, e.g., age, gender, marital status, etc. An example of such a database is the demographic and lifestyle database available from NDL International Ltd.

Database interface module 40 is preferably configured to permit access to relational, hierarchical, object-oriented, ASCII and other types of files. Preferably, database interface module 40 operates in a read access only mode and will not permit a user to update the databases being accessed. However, database interface module 40 may be configured to operate in other modes if desired. Preferably, system 10 permits a user to select a type of database to be processed, request a particular database by name, view the database contents after selection, and configure the system to use either the entire database or a portion thereof. The data formats which may be contained in the database include, for example, text, numeric, date/time, boolean and other types of data. System 10 preferably validates database information provided by the user such as type selection, existence of the selected database or file, non-empty databases, and the minimum number of fields or records of data to be configured. Database configuration preferably consists of selecting portions of the database (or the entire database) to be processed by system 10. Database configuration also encompasses specifying the data type, and input/output format specifications for each selected data field.

Processor 12 also includes a preprocessor module 46. Preprocessor module 46 preferably allows the user to set certain preprocessing specifications to place certain types of data in a form most suitable for analysis by system 10. For example, as the user selects database fields to be processed in the database configuration process, the preprocessing module 46 can be configured to prompt the user to select a data type, input format, output format, processing specifications, and units associated with each field, as may be appropriate. Preferably, processing specifications are used to denote how a particular field will be processed through knowledge discovery system 10. Alternatively, preprocessing specifications may have default values autonomously set and/or selected by system 10.

Data may be processed in two different ways. First, it may be used directly in data reduction techniques to cluster data as described elsewhere in greater detail. Alternatively, it may be used as a means of summarization by occurrence within clusters of data. Preferably, clustering specifications are, by default, applied to all fields of data except text. Summarization is preferably applied to text fields.

Preprocessor module 46 may also allow identification of units associated with a particular data type for use in the formatting of answers (e.g., correlations of data fields within clusters). Units help identify the type of data being referenced. Some examples include: inches, square feet, degrees, Celsius, PSI, percent, cents, etc. The preprocessor functions actually implemented depend on the data type being analyzed.

Data processor 32 uses data acquisition and output function 40 and data management function 42 to receive and manipulate data in performing data analysis. Such data is typically found in one or more databases 44 that may be stored on one or more tape drives 22 or disk drives 24.

Within data processor 32, system 10 also includes data reduction module 50. Data reduction module 50 preferably enables system 10 to transform large numbers of data (preferably in the form of records) into relatively small numbers of groups or clusters. This transformation, or reduction may be accomplished, for example, by a data reduction function contained within the data reduction module 50. Preferably, clustering is accomplished based on a commonality of at least two of a plurality of parameters represented in the data being processed. For example, a database may contain a number of records, each record being separated into a number of fields. The fields may serve as the plurality of parameters of the database. The records may be reduced into clusters based on, for example, a frequency of occurrence of given fields or by a commonality of values, or ranges of values, within certain fields. Each cluster, therefore, represents a learning component with a certain degree of commonality among the data within the particular cluster.

Data reduction module 50 preferably includes many available data reduction functions or methods for reducing the data into the one or more groups based on the plurality of parameters within the data. Data reduction module 50 preferably includes at least a genetic clustering function. Data reduction module 50 may also incorporate a hierarchical valley formation function, a fuzzy case clustering function, a relational clustering function, a minimum distance classifier clustering function, a K-means clustering function, a Kohonen neural network clustering function, a categorization function and/or other data reduction functions. Preferably, each of the data reduction functions is capable of reducing the data from databases 44 by reducing the data into at least one group of data based on a plurality of parameters. Data reduction module 50 should also include a symbolic expansion reduction tool which allows nonnumerical data to be numerically represented. This enables nonnumerical data to be reduced or clustered. The fuzzy case clustering function may also be used to enable reduction of symbolic data. Data reduction module 50 preferably includes a icluster estimation tool for estimating the number of clusters within a data set.

As noted above, a genetic clustering function preferably serves as one of the available functions for reducing data. Genetic clustering is a method of clustering data that is used to develop an optimized set of data clusters independent of the order in which the data is processed. Genetic clustering forces an initial set of alternative data reduction schemes to "evolve" into an optimized scheme by applying a Darwinian theory of natural selection. By measuring the "fitness" of a given data reduction scheme, the most fit options can be selected and given a chance to "reproduce," thus forming new "children" which may inherit the good characteristics of one or more "parents." Mutation is the random change in one of the characteristics, or "genes," of a parent or child. By mixing reproduction with mutation, a "species" of the data reduction schemes evolves until a set of goals are achieved.

The genetic clustering function has several advantages relative to data reduction. For instance, data can be processed to create clusters of data independent of the order of the data. This technique encompasses a guided random search through extremely large search spaces (such as a database with many different fields). Once a cluster or set of clusters is established, the data reduction scheme for the subject database may be stored, thus forming the starting point for future and/or continued reduction of the database. Fine tuning of the data reduction parameters is optimized along with the overall data reduction scheme. Also, this technique facilitates solving nonlinear problems.

The genetic clustering function preferably operates according to the following steps. First, one or more random solutions are generated, represented as a string of data denoting cluster centers, cluster dimensions and cluster shapes, thereby minimizing the overlap of clusters. Second, each solution is assigned a fitness value which indicates how well each solution fits the data. Third, the function automatically determines whether any termination criteria exist. To reach termination, the genetic clustering function evaluates the stability of the surviving population of clusters. Repeated survival of clusters (e.g., over ten generations) indicates that minima have been achieved. To ensure that a global minimum has been reached (as opposed to local minima), the mutation rate is randomly increased when the population appears stable. If the population continues to remain repeatedly constant, a global minimum has been reached. Preferably, the user does not have to set termination criteria or mutation rates. Fourth, individual solutions are randomly selected proportionate to the solution fitness for a given solution. Fifth, every two selected solutions are mated by allowing the random mutation of one data gene and/or by mixing the data genes of each solution at a random location (e.g., crossover) to produce one or more new solutions (children). "Location" is the position of a gene in a chromosome string which is used by a crossover operator. A "crossover operator" is an operator which divides the chromosome strings of the parents at certain genes (locations), and combines these chromosome segments from the parents to form the chromosome string of the child. Thus, the child will inherit some qualities from one parent and others from the other parent. The intent is to allow the "good" qualities of the parents to be passed on to the future generations. From this point the function can return to the second step of assigning fitness values to the new solution children. Finally, if the termination criteria are met, the data string is translated into a set of clusters.

Figure 2:
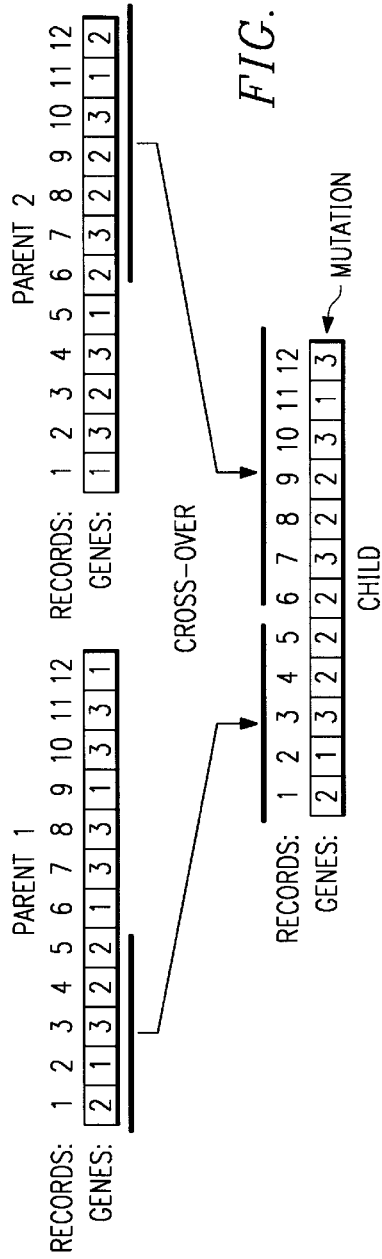
FIG. 2 is a schematic representation of the operation of a genetic clustering function in accordance with an embodiment of the present invention.

FIG. 2 depicts the chromosome string for two parents and their child, illustrating both crossover and mutation operators for composing the child's genes. In this example a database of 12 records is being clustered (hence 12 genes for each individual). The estimated number of clusters is 3. Therefore, each gene may be occupied by a value between 1 and 3. Parent 1 suggests that cluster #1, for example, consists of data points 3, 7, 8, 10 and 11. Similarly, other individuals group the data points into the three clusters. The Child inherits its first 5 genes from Parent 1 and the remaining genes from Parent 2 (e.g., the crossover operator). The Child's gene #12 (the mutation operator) was randomly mutated to a value not inherited from its parents. Thus, the Child proposes a different arrangement of data points to form clusters. It should be noted that various other techniques for pairing parents, sexual and asexual reproduction, and other inheritance mechanisms may be used as defined by the genetic clustering function to fine tune the search process.

Initially, a finite number of individuals are created on a random basis. At the end of each generation, all individuals are ranked by the fitness function, which is an analog measure of the dispersion of numerical data points, and a binary measure of the dispersion of symbolic data points. Other data types (e.g., date, time, currency) will have their distinct measures of closeness to be used by the fitness function. The lower the dispersion in each case, the higher the ranking for the individual. Thus, the fittest individuals will be selected to survive to the next generation, and the remaining individuals are removed from the population. The termination criteria will be the stability of the surviving population. Many tuning parameters offered by the genetic clustering function may be used to optimize the search process.

Pseudo-Code for the genetic clustering function may be represented as follows:
1. Select, open and read a database, query or table (N records, F fields).
2. Ensure the cleanliness and validity of all data.
3. Estimate the number of clusters (e.g., by the use of a separate tool).
4. Define a fitness function (e.g., shortest distance between numerical data points, frequency matches for symbolic data, etc.) capable of ranking an individual based on the quality of clusters it proposes.
5. Create a population of P individuals. The number of individuals (P) is not critical, but a default of ⅓ of the number of clusters is recommended, with a minimum of 10 individuals in the population.
6. Create F genes for each individual.
7. Populate each gene by assigning an integer value between 1 and N to each gene. Initially, assign values to each individual's genes on a random basis (in the range 1 to N).
8. Select a mating strategy (e.g., fitness proportionate).
9. Using the mating strategy, pair individuals in the population.
10. Create children using crossover and mutation operators.
11. In the crossover operator, randomly select genes to be inherited from each parent.
12. In the mutation operator, randomly select gene(s) to be mutated and randomly assign values to such genes.
13. Rank all individuals using the fitness function.
14. Retain the highest ranking P individuals and remove the remaining individuals from the population.
15. Repeat steps 10 through 15 until the termination criterion is reached.
16. The termination criterion is defined as the state in which the same individuals survive for P generations.
17. After termination criterion is reached, select the highest ranking individual as the winning individual.
18. Define clusters by analyzing the genes of the winning individual.
19. Perform any necessary cluster analysis (e.g., calculation of mean, standard deviation, skewness, kurtosis, etc.).

To avoid being trapped in a local minima during the genetic reduction, the following strategy may be used:
  A. Initially use a high mutation rate (e.g., close to 1). The mutation rate defines the frequency by which individuals will mutate.
  B. Gradually decrease the mutation rate (e.g., close to 0) as generations pass.
  C. When the termination criterion is reached, suddenly and rapidly increase the mutation rate for P generations.
  D. If the same individuals continue surviving, then use them as the output of the genetic search (e.g., high convergence confidence).
  E. If new individuals enter the population, then continue steps 10 through 15 above (moving out of a local minimum) and apply this strategy (A–E).

Figure 3:
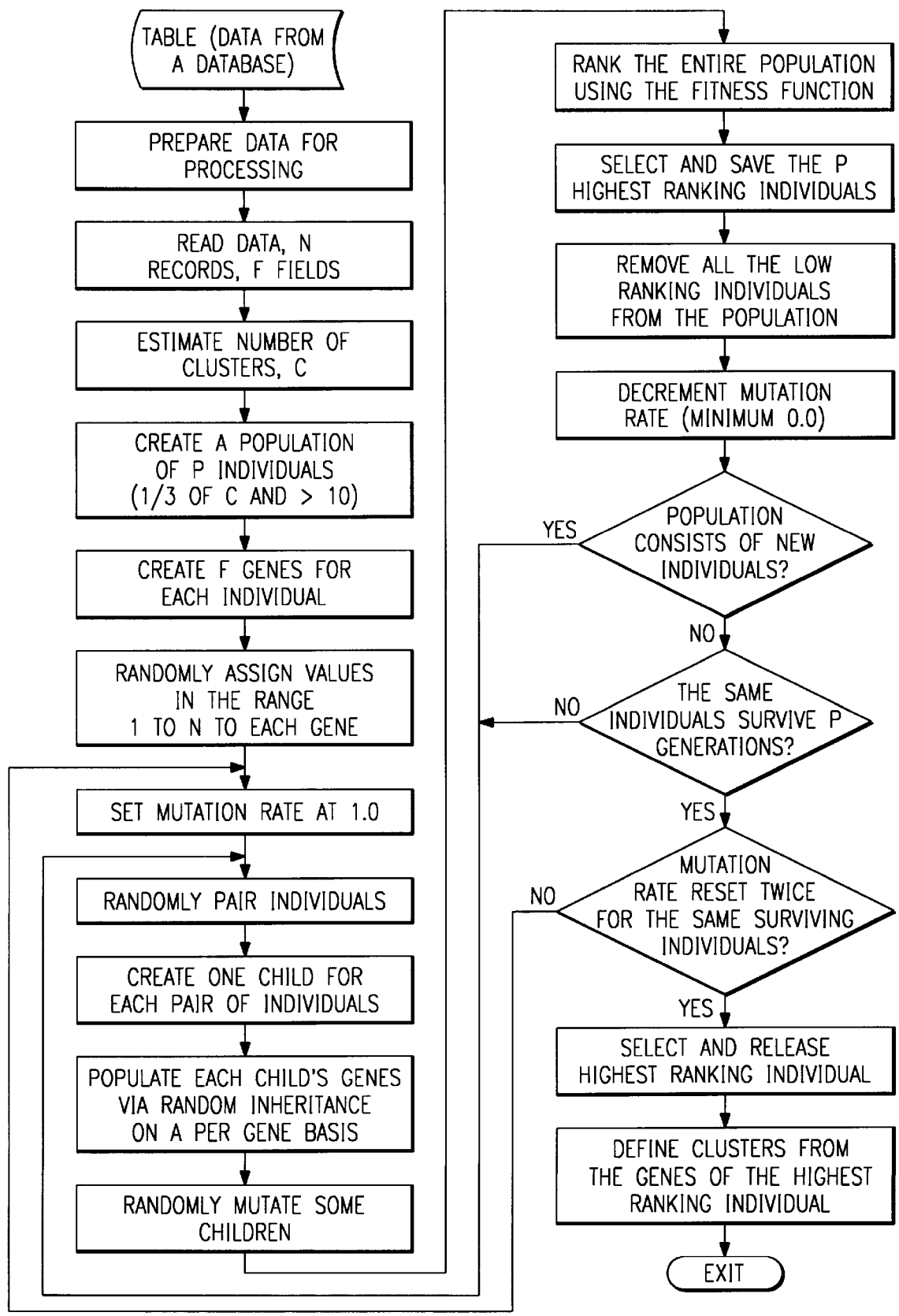
FIG. 3 is a flow chart representation of the operation of a genetic clustering function in accordance with an embodiment of the present invention.

A flow chart showing the basic structure of the genetic clustering function is provided in FIG. 3. The flowchart reflects the basic steps and strategy discussed above.

To estimate the number of clusters for the genetic clustering function or for any other clustering function which benefits from such an estimate, a cluster estimation tool may be used. Preferably, the cluster estimation tool is incorporated into data reduction module 50, but may reside elsewhere within the system 10. The cluster estimation tool estimates the number of clusters in a data set. Developed partially with the support of empirical data, various pertinent attributes of a data set are used to provide the estimate. Preferably, the estimation tool repetitively estimates the number of clusters until the calling clustering function produces satisfactory clusters.

The cluster estimation tool operates based on the following estimation equation:

$$CE = C \cdot \frac{\text{Log}(N)^{\text{Log}(F)} \cdot \text{Log}(PS) \cdot \text{Log}(PN)}{\text{Log}(PG+1)+1}$$

CE is the estimate of the number of clusters. C is a clustering constant which is greater than or equal to 1 (default=1). N is the number of records in the database. F is the number of fields in the database. PS is the percentage sampling rate of records in the database (range of from 0 to 100). This value is set based on the availability of memory in the computer to avoid memory starvation during program execution. PN is the percentage of the overall data which is in numerical form (range of from 0 to 100). PG is the percentage of the average granularity of numerical data (range of from 0 to 100). This parameter is established by calculating the average of the minimum distances between any two data points along any numerical dimension and dividing that distance by the range of the data in the respective field.

The cluster estimation tool may be used, for example, according to the following steps:
1. The clustering constant C is initialized with a value of 1.
2. The database is reviewed to discover values for N and F.
3. The database is pre-analyzed to calculate the values for PS, PN and PG.
4. The number of clusters is estimated according to the estimation equation.
5. The calling clustering function creates the estimated number of clusters.

6. The clusters are analyzed for emptiness (or near emptiness).
7. If no cluster is empty, then the constant C is increased by 25% and steps 4–7 are repeated (i.e., more clusters are needed than the original estimate). If there are empty clusters, then the empty clusters are removed and the process is terminated.

Figures 4, 5:
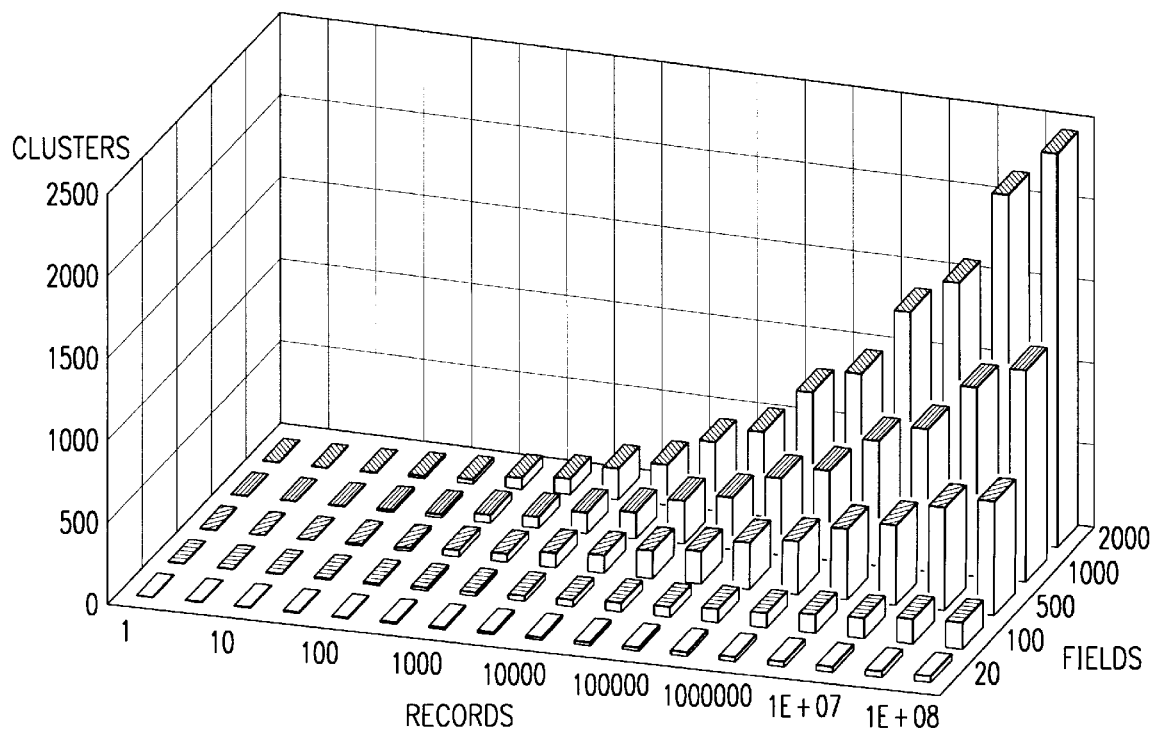
FIG. 4 is a table depicting the operation of a cluster estimation function in accordance with an embodiment of the present invention.
FIG. 5 is a graphical display of the operation of a cluster estimation function in accordance with an embodiment of the present invention.

For example, assuming a database is provided in which PS=50, PG=1, PN=20, and C=1.0. Then, the table in FIG. 4 illustrates the number of clusters estimated as a function of N and F. The clusters are also graphically illustrated in FIG. 5.

Hierarchical valley formation is another clustering function which may serve as one of the available functions for reducing data. This function is a deterministic clustering function, which operates independent of the order or distribution of data points. The data points should be in a numerical format. Nonnumerical data may be converted to numerical form using any appropriate conversion tool (e.g., symbolic expansion reduction). The data points and/or data fields may be individually weighted when local bias is required. The hierarchical valley formation function operates in an N-dimensional space, corresponding to a database consisting of N fields. Each data point exerts a "force" against a hypothetical N-dimensional elastic sheet (e.g., a hyper sheet). The aggregate of these forces causes deformation of the hyper sheet, forming valleys where data points tend to represent clusters. The analysis of the valleys identifies the cluster centers and any hierarchical relationship among the cluster centers.

Pseudo-Code for the hierarchical valley formation function may be represented as follows:

1. Read D numerical data points (each with N fields) and their associated weights (W).
2. Create an N-dimensional hyper sheet.
3. Measure the smallest distance between the two closest data points for each field (L).
4. Divide the hyper sheet into a hyper mesh, where the mesh grid points in each dimension are not more than ½ of L for that dimension.
5. Cycle through all the hyper mesh grid points and, for each point, calculate the distoration F as the result of the force applied by all data points. Each distoration F is calculated by the formula $F=W/(S \cdot X^M)$, where W is the weight of the data point, S is the hyper sheet stiffness parameter (empirically determined and generally in the range of from 1 to 5), X is the Euclidian distance between the hyper mesh grid point and the applicable data point, and M is the elasticity parameter in the range of from 2 to infinity. The default elasticity factor is 2 to obey the inverse square law.
6. Calculate the sum of all forces F applied to each hyper mesh grid point, representing the total deformation at each mesh point.
7. Identify the cluster centers by identifying the hyper mesh grid points with maximum values compared to their neighbors. Any appropriate polynomial method may be used (e.g., B-spline, Bezier, moving average).
8. If necessary, perform further analysis on the deformation space to identify any hierarchical relationship among the cluster centers.

Figure 6:
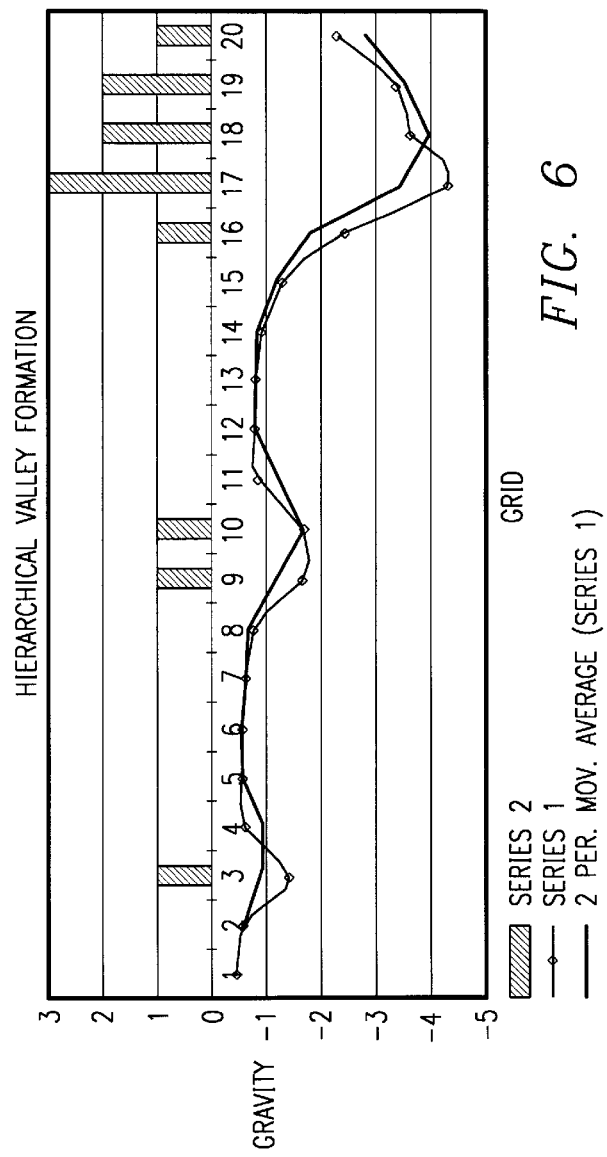
FIG. 6 is a graphical display of the operation of a hierarchical valley formation function in accordance with an embodiment of the present invention.

An example of the operation of the hierarchical valley formation function is depicted in FIG. 6. A flowchart depicting the steps of hierarchical valley formation is provided in FIG. 7.

A minimum distance classifier function preferably serves as one of the available functions for reducing data. The minimum distance classifier function is a data clustering method based on a predefined measure of "closeness" between any two data points for a given field. This function is a single pass process through a data set, in which all the necessary clusters are defined, and the points in the data set are assigned to the clusters. At the beginning of the process, a minimum distance for each dimension, or field, is supplied by the user or calculated by an external algorithm. A default minimum distance may be automatically calculated by a percentage distribution of data along the dimension of the field in question. For example, two data points in a "Temperature" field might be considered "close" by the function if their difference is less than 3 percent of the overall range of temperatures listed in the database for the "Temperature" field. The minimum distance is crucial to the operation of the function and the formation of clusters.

During the clustering process, the minimum distance classifier function essentially checks to see if any given point in the data set is "close" to an existing cluster (e.g., the distance between the point and the center of the cluster is less than the predefined minimum distance). If so, the point is assigned to the cluster and the cluster's center is updated. If the point cannot be assigned to an existing cluster, then the minimum distance classifier function creates a new cluster and assigns the point to this new cluster. The process repeats for all the data points.

The minimum distance classifier function is preferably accomplished according to the following procedure. First, a minimum distance is defined. Second, all of the data points of the data set are read into the computer's memory so that all of the data is available for processing by the function. Third, a cluster count is set to zero. Fourth, a first data point is read. Fifth, a first cluster is created. Sixth, the first data point is assigned to the first cluster. Seventh, the first cluster's center is updated. Eighth, a clustering routine is performed on the remaining data points. In this routine, each subsequent data point is read. If the distance from a data point to the center of the first cluster is less than the predefined minimum distance, then the data point is assigned to the first cluster. Otherwise, a second (or subsequent) cluster is created and the data point is assigned to the second (or subsequent) cluster. After each data point is assigned to a cluster, that cluster's center is updated. As a final step, the routine is terminated when all of the data points have been assigned to one of the clusters. Minimum distance classifier programs are generally known. Therefore, an example of the code for such a program is not provided.

A K-means clustering function preferably serves as one of the available functions for reducing data. The K-Means function is a method of clustering based on a predetermined number of clusters. It is based on the minimization of the sum of squared distances from all points in a cluster domain to the cluster center. Initial cluster centers are chosen arbitrarily. Records from the database are then distributed among the chosen cluster domains based on minimum distances. After records are distributed, the cluster centers are updated to reflect the means of all the records in the respective cluster domains. This process is repeated as long as the cluster centers continue to move. At the point when all cluster centers remain static, the cluster centers have converged, and the process is complete. Thus, this function iterates as many times as are necessary for the cluster centers to converge. Performance of this function is influenced by the number and location of the initial cluster centers, and by the order in which pattern samples are passed through the program.

Preferably, the K-means clustering function operates according to the following procedure. First, a number of clusters is defined by a user or an external algorithm. Second, all the data points within the data set are loaded into the function. Preferably, the data points are indexed according to a numeric field value and a record number. Third, a cluster center is initialized for each of the predefined number of clusters. Each cluster center contains a random normalized valued for each field within the cluster. Thus, initial centers are preferably randomly defined. Alternatively, initial cluster center values may be predetermined based on equal divisions of the range within a field. In a fourth step, a routine is performed for each of the records in the database. For each record number from 1 to the current record number, the cluster center closest to the current record is determined. The record is then assigned to that closest cluster by adding the record number to the list of records previously assigned to the cluster. In a fifth step, after all of the records have been assigned to a cluster, the cluster center for each cluster is adjusted to reflect the averages of data values contained in the records assigned to the cluster. The steps of assigning records to clusters and then adjusting the cluster centers is repeated until the cluster centers move less than a predetermined epsilon value. At this point the cluster centers are viewed as being static. K-means clustering programs are generally known. Therefore, an example of the code for such a program is not provided.

A Kohonen neural network function preferably serves as one of the available functions for reducing data. A Kohonen network is a self-organizing neural network inspired by the retina in mammalian visual systems. The network consists of two layers of neurons including a one-dimensional input layer and an output layer of at least two dimensions. The neurons in the two layers are highly interconnected. Each neural connection has a weight which may be designated as $U_{ij}$ (the connection weight between input neuron i and output neuron j for all i and j). Inputs are presented to the input layer's neurons. These inputs may be designated as $E_i$ (input to the input neuron i for all i). The network is first "trained," using a training set captured in a database. The network is subsequently used to solve new problems. The training algorithm repeatedly cycles through all the records in the training set. For each record, the training algorithm attempts to find the winning neuron in the output layer. The winning neuron is the output neuron j where $E_i - U_{ij}$ is minimal for all i. The connection weights to the winning output neuron are then changed by a factor of $C_t(E_i - U_{ij})$, where $C_t$ is a relatively small learning factor (e.g., in the range of from 0 to 1) at a learning iteration t. $C_t$ decreases as t increases. Thus, any number of output neurons will be trained to "recognize" input patterns. The Kohonen network is capable of clustering, where each cluster is defined by a single neuron in the output layer. The cluster centers are defined by the connection weights to the particular output neuron. Kohonen neural network clustering programs are generally known. Therefore, an example of the code for such a program is not provided.

Most clustering functions require numerical data as input. However, many databases contain symbolic data. System 10 may incorporate a symbolic expansion reduction tool for allowing analysis of data in symbolic form. This function temporarily converts symbolic data into numerical data for clustering purposes. The numerical data is then converted back into symbolic data for analysis. During the conversions, the noncontinuous nature of the symbolic data is maintained.

Pseudo Code for the symbolic expansion reduction function may be represented, for example, as follows:

1. Examine data table to determine which fields are scalar, date/time, or symbolic (textual, or numeric representing discrete items).
2. Scan through entire data file and for each field:
   a. If date/time or scalar, store minimum, maximum values encountered and calculate mean.
   b. If symbolic, determine value of field in this record and store this value, if it has not already been stored, in a sorted list.
3. Expand each symbolic field in the table to a number of fields equal to the number of distinct values for that field encountered in the data.
4. Calculate a weighted value to be used in normalization for each symbolic field, based on the number of distinct values for that field.
5. Scan through the entire data file to normalize data:
   a. If date/time, convert value to a scalar value (count of number of elapsed seconds since 1900, e.g.) and normalize this as with any scalar field.
   b. If scalar, normalize data by using: normalized value= (max−value)/(max−min).
   c. If symbolic, store a weighted value based on number of distinct values in the expanded field associated with the distinct value, and a value of 0 in all other expanded fields.
6. Use any statistical clustering technique on the normalized data.

Figure 8:
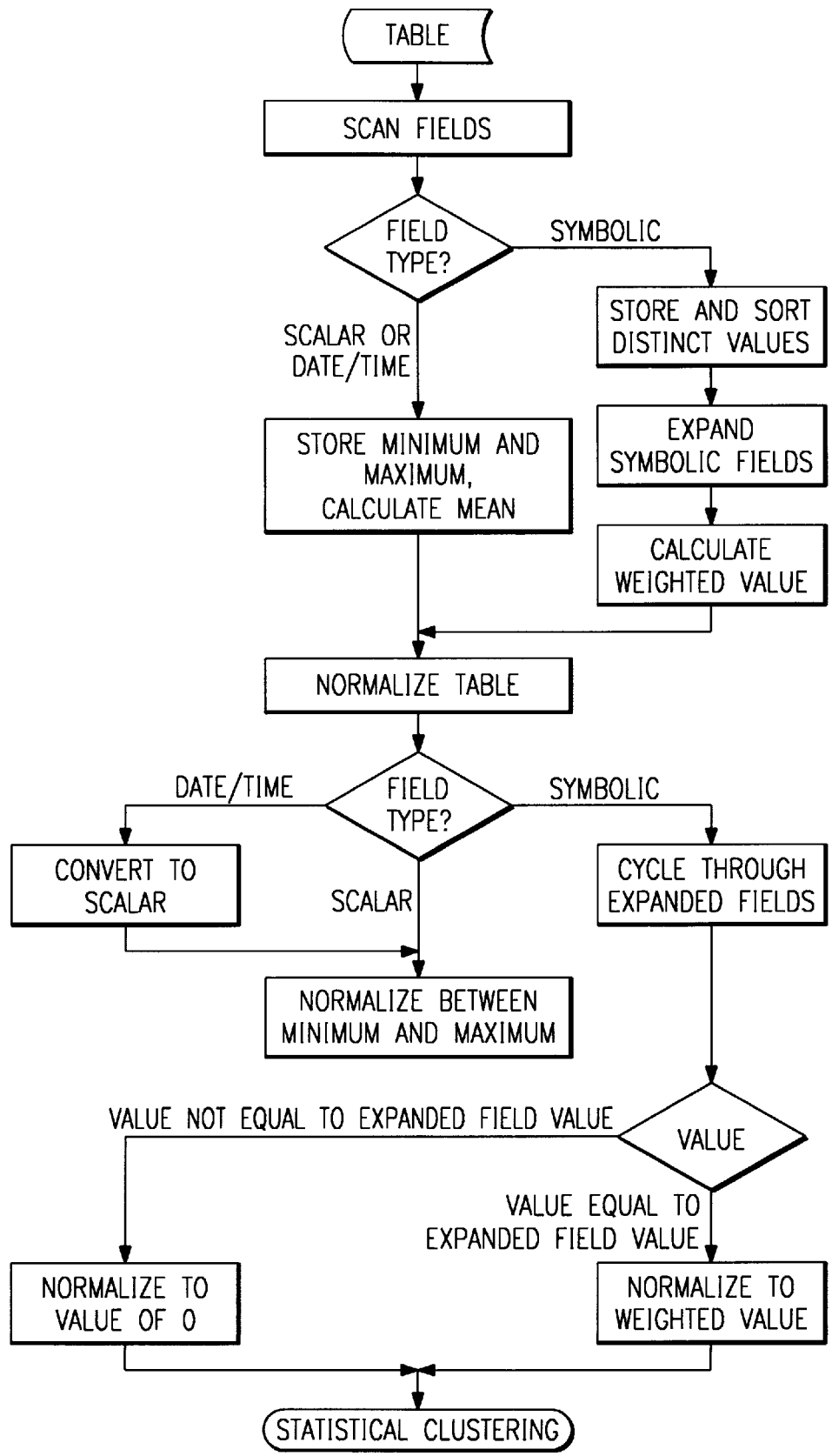
FIG. 8 is a flow chart representation of a symbolic expansion reduction function in accordance with an embodiment of the present invention.

The steps for the symbolic expansion reduction function are also expressed within the flow chart provided in FIG. 8.

A fuzzy case clustering function may also be incorporated to allow analysis of data in symbolic form. This function temporarily converts numerical and symbolic fields to a discrete numerical representation for clustering purpose. Then, the data is converted back to its original form for further analysis. During the conversions, the noncontinuous nature of the symbolic data is maintained.

Pseudo Code for the fuzzy case clustering function may be represented, for example, as follows:

1. Select a Database or File.
2. If a Database is selected, select a Table and select the subject Fields within the Table.
3. Set Number Of Clusters=0.
4. Set Total Dimension Count=0.
5. For each Field in File or each selected Field in Database/Table, determine if numeric or symbolic data is contained in Field.
   a. If symbolic:
      (i) Determine number of unique values within Field
      (ii) Add number of unique values to Total Dimension Count.
      (iii) Multiply Number Of Clusters by the number of unique values.
      (iv) For each unique value, determine number of occurrences (% of total)
   b. If numeric:
      (i) Determine Minimum value in Field.
      (ii) Determine Maximum value in Field.
      (iii) Calculate range of Field (Max−Min).
      (iv) Classification Boundary 1 (e.g., lower boundary of "Very Low" classification level)=Minimum value.
      (v) Classification Boundary 2 (e.g., upper boundary of "Very Low" classification level and lower boundary of "Low" classification level)=10% of Maximum value.
      (vi) Classification Boundary 3 (e.g., upper boundary of "Low" classification level and lower boundary of "Medium" classification level)=35% of Maximum value.

(iv) Classification Boundary 4 (e.g., upper boundary of "Medium" classification level and lower boundary of "High" classification level)=65% of Maximum value.

(v) Classification Boundary 5 (e.g., upper boundary of "High" classification level and lower boundary of "Very High" classification level)=90% of Maximum value.

(vi) Classification Boundary 6 (e.g., upper boundary of "Very High" classification level)=Maximum value. Multiply Number Of Clusters by 5. Add 5 to Total Dimension Count.

6. For I from 1 to Number Of Clusters
   For J from 1 to Number Of Fields
     For K from 1 to Number Of Dimensions [J]
       Dimension [J,K] boolean value=false
   /* Initialize empty clusters—each cluster contains one boolean value for each unique value within each symbolic field and one boolean value for each classification level within each numeric field/

7. For I from 1 to Number Of Clusters, initialize clusters to represent all possible combinations of boolean values that could occur (requires recursive looping).

8. For I from 1 to Number Of Records (or some sampled percentage of records), convert any numeric field values to their symbolic classification level (e.g., 500= Medium).
   For J from 1 to Number Of Clusters
     If pattern of record exactly matches pattern of cluster
       Add 1 to Cluster's Member Count. Add record # to Member List (Optional—only need if user wants to identify exactly which records are in the cluster). Read next record.
     Else, read next cluster.

9. For I from 1 to Number Of Clusters, remove all clusters that are significantly small (e.g., Member Count<threshold value).

10. For I from 1 to Number Of Clusters
    For J from 1 to Number Of Fields
      If field type is numeric
        Use Member List to get actual numeric values for these records/fields.
        Use numeric values to calculate field mean, min, max standard deviation, distribution, etc.

11. For I from 1 to Number Of Clusters
    Perform inferencing on clusters to generate higher level clusters. For example, suppose two clusters are bound from above process. Assume the first cluster contains 10 members, where Price (1st numeric field) is High ($35,000 average value), Color is Red (of Red or Black), and Boat Type is Ski (of Ski, Fishing or Pontoon). Assume the second cluster contains 5 members, where Price (1st numeric field) is High ($35,000 average value), Color is Black (of Red or Black), and Boat Type is Ski (of Sail, Pleasure or Ski). The user may now want to generate a new, higher level cluster based on the combination of the first two clusters, where Price is High, Color is Red with a 66% confidence (or Black with a 33% confidence) and Type is Ski.

12. For each cluster, establish confidence factors based on frequency of occurrence.

13. Report findings to user.

Figure 9:
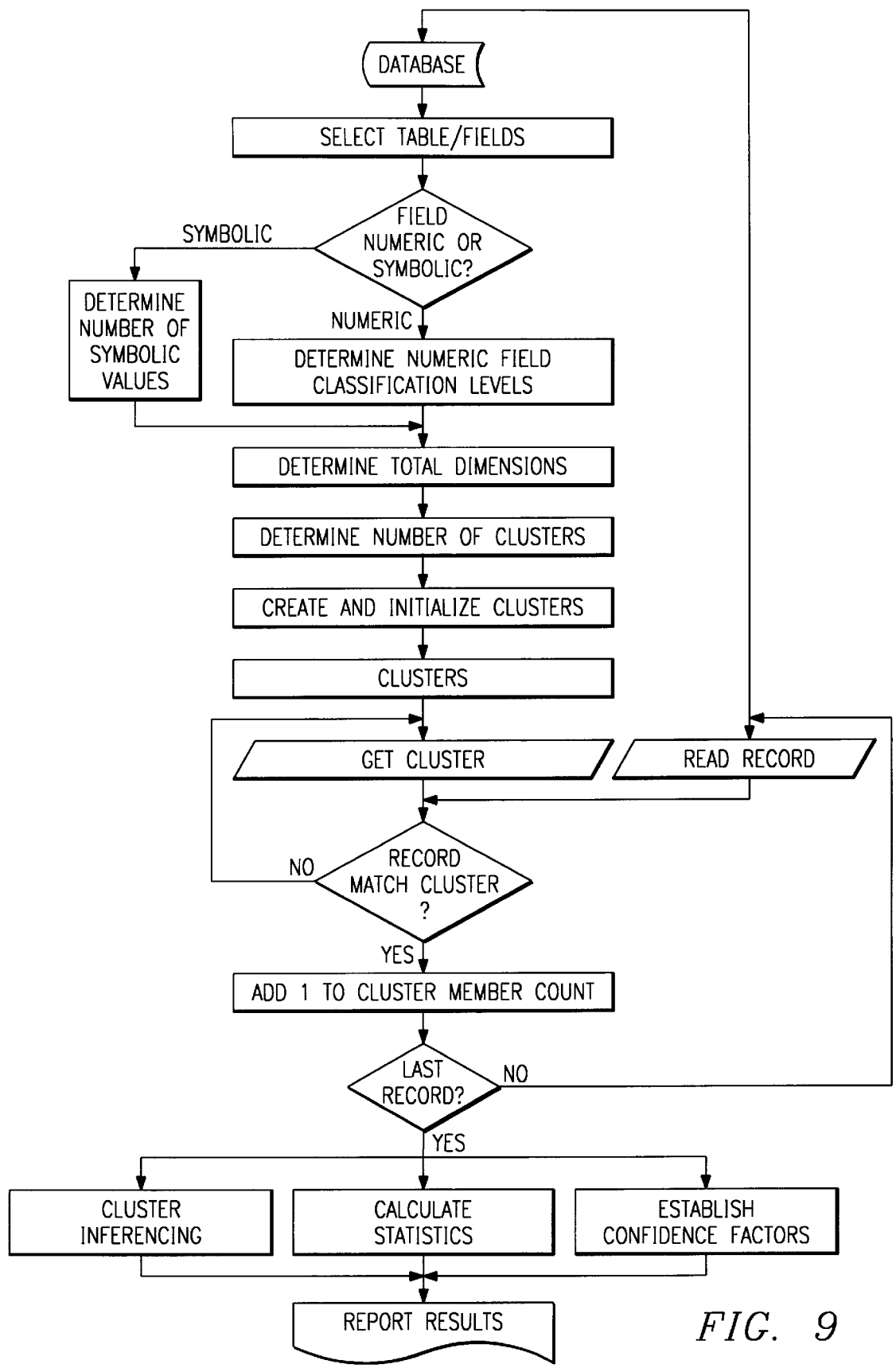
FIG. 9 is a flow chart representation of a fuzzy case clustering function in accordance with an embodiment of the present invention.

The steps of the fuzzy case clustering function may be represented, for example, by the flow chart provided in FIG. 9.

Figures 7, 10:
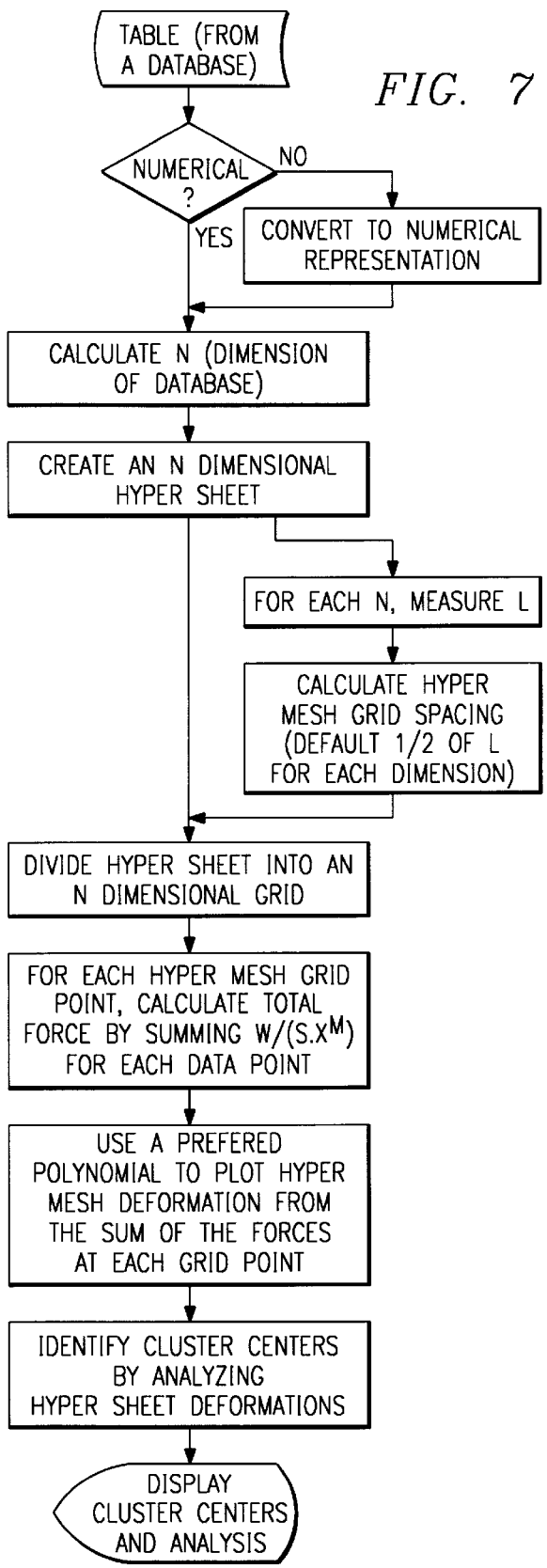
FIG. 7 is a flow chart representation of a hierarchical valley formation function in accordance with an embodiment of the present invention.
FIG. 10 is a table depicting the operation of a fuzzy case clustering function in accordance with an embodiment of the present invention.

In connection with step 7 in the above pseudo code for fuzzy case clustering, the table provided in FIG. 10 represents an example of how each of the clusters may be initialized, representing each possible combination of values that could occur on any particular record in the database. The ones on the table represent turning on the boolean value for that particular field/dimension in the cluster. The table assumes a sample database which contains 3 fields. Field 1 is numeric and thus contains 5 dimensions (1 for each classification level). Field 2 is symbolic and contains 2 dimensions (or 2 unique values that can occur). Field 3 is symbolic and contains 3 dimensions. The total dimensions are calculated as 5+3+2=10. The number of clusters is calculated as 5·3·2=30.

A relational clustering function may also be incorporated to allow analysis of data in symbolic form. The relational clustering function divides the database into two parts, numerical and symbolic. The function performs numerical clustering on the numerical data, and symbolic clustering (e.g., by frequency analysis) on the symbolic data. Then, the function scans through all the records in the database, linking the numerical clusters to symbolic clusters based on their common occurrences in the database. The links are weighted based on their frequency of occurrence. Output clusters are defined as the paired numerical and symbolic clusters, with degrees of confidence (link weights).

Pseudo Code for the relational clustering function may be represented, for example, as follows:

1. Load a database.
2. Create a Numerical Table consisting of all the records and their numerical fields.
3. Create a Symbolic Table consisting of all the records and their symbolic fields.
4. Using the Numerical Table, create n numerical clusters, NCn, with centers and confidences.
5. Each NCi will have a center NCCi and confidence NCDi.
6. Using the Symbolic Table, create m empty symbolic clusters, SCm, where m is the multiplication of the dimensions of all the symbolic fields.
7. Each SCj counts the number of records in the Symbolic Table that belong to it, thus measuring the frequency of occurrence for each symbolic cluster, SCFj.
8. All SCj and NCi which are sufficiently "small" are eliminated.
9. Correlation measures between each pair of SCj and NCi are measured and recorded as cluster relation factors (or weights) CRFij.
10. All CRFij which are sufficiently "small" are eliminated (e.g., no meaningful correlation among their respective clusters).
11. CRFij is calculated by evaluating the closeness of each SCj with the center of each cluster via cycling through the records in the database.
12. Output the discovered knowledge as a group of numerical clusters associated with a group of symbolic clusters via cluster relation factors (weights).

Figure 11:
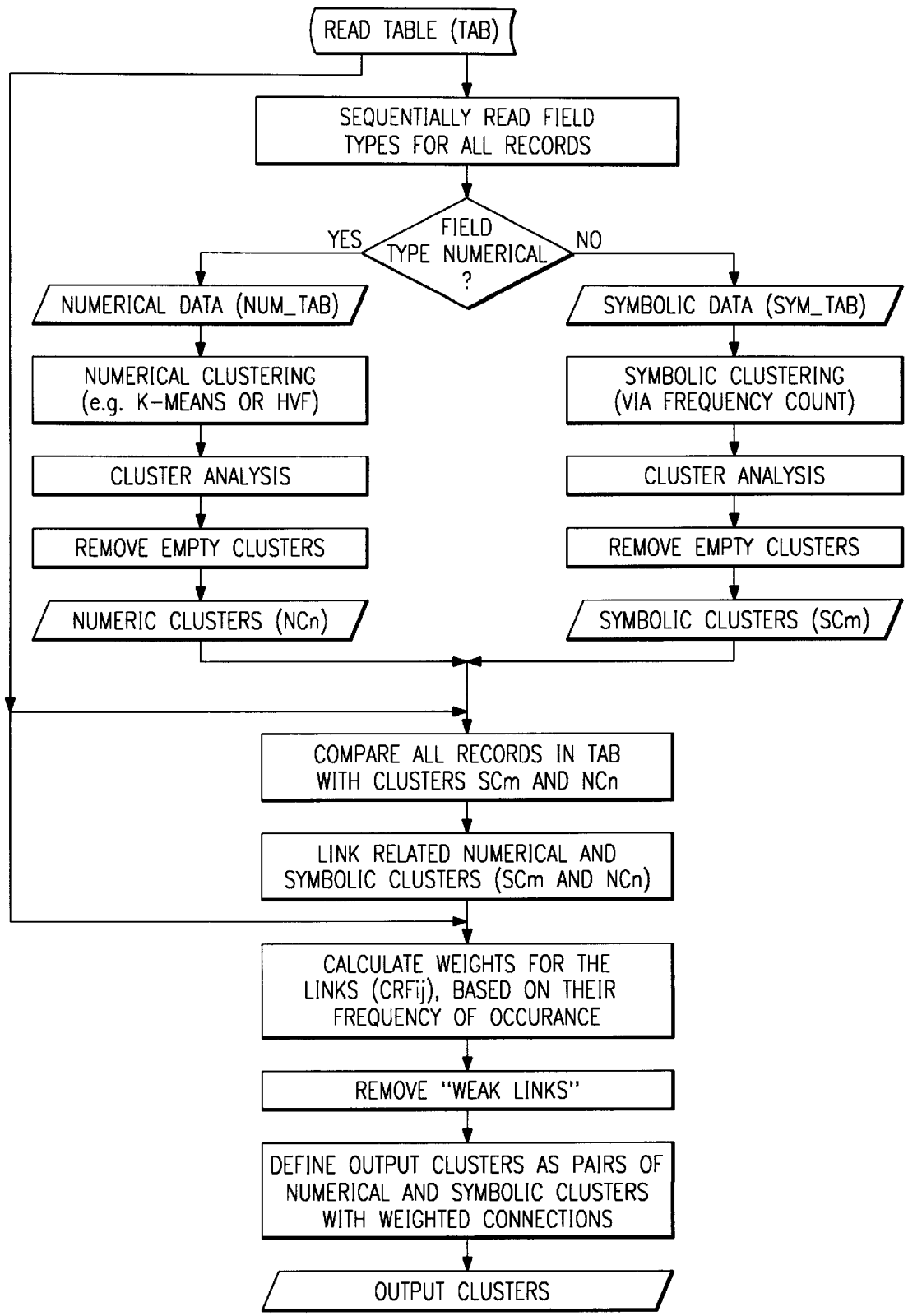
FIG. 11 is a flow chart representation of a relational clustering function in accordance with an embodiment of the present invention.

The steps and processes of the relational clustering function are depicted in the flow chart provided in FIG. 11.

Figures 14, 15:
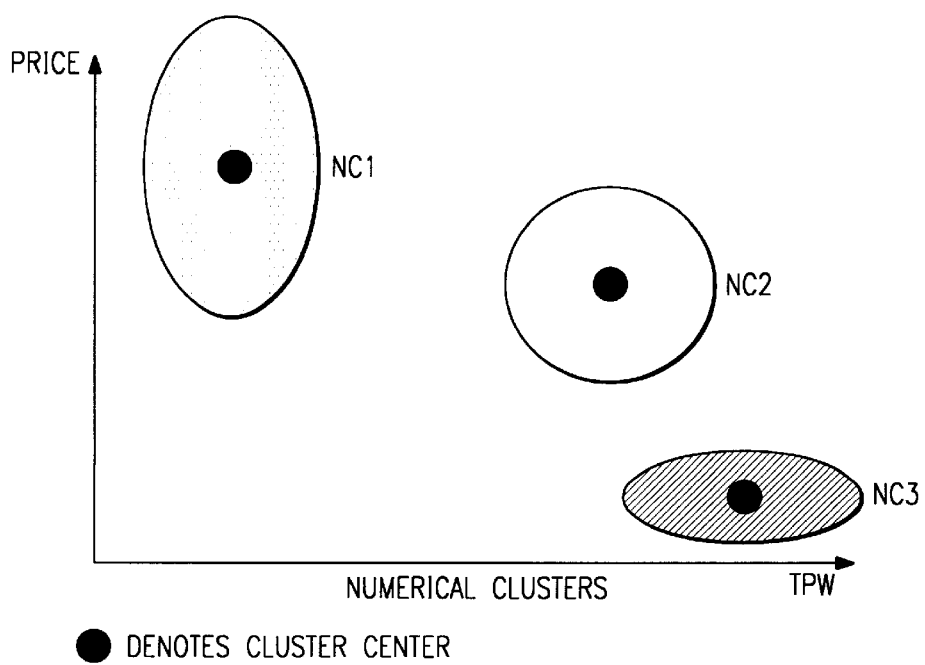

As an example of the operation of the relational clustering function, one may begin with a database as represented in FIG. 12. The Numerical Table shown in FIG. 13 is created according to the above-described steps. The Symbolic Table shown in FIG. 14 is also created. The Numerical Table is used as described above to find the clusters as shown in FIG.

15. The Symbolic Table is used to create the nine symbolic clusters (3 colors, 3 body styles) shown in FIG. 16. The small clusters are eliminated and the remaining clusters are tagged as shown in FIG. 17. Each record in the database now belongs to a symbolic cluster. If not, the record is considered to be noise. The function then cycles through the records in the database to categorize each record in a symbolic cluster, and calculate its relational factor to each numerical cluster. The relational factors are depicted in the table provided in FIG. 18. With the information from the database, system 10 may use the function to select symbolic cluster SC2 (highest confidence), and related numerical cluster NC1 (highest relational value) to discover that a Ski boat is typically Red, costs $39,500 and can support a total passenger weight ("TPW") of 1425 lbs.

Preferably, data reduction module 50 includes an expert system 51. Expert system 51 serves several purposes and provides various functions without input from the user. First, expert system 51 automatically selects an initial one or more data reduction functions from those available. Preferably, this selection is based on an architecture of the database being analyzed. Second, expert system 51 automatically changes the particular one or more data reduction functions used by system 10, if necessary, to improve the performance of system 10. Third, if a data reduction function requires the setting of initial conditions, expert system 51 automatically selects the appropriate initial conditions and/or sets values for these conditions. Several of the data reduction functions may utilize various initial conditions in order to configure the function. For example, the K-means function requires the number of clusters to be specified before any processing can occur. The minimum distance classifier function, for example, requires a measure of distance to be specified. Expert system 51 preferably determines which initial conditions should be used by a particular data reduction function and preferably determines an optimal value for each initial condition based upon the data being examined. Thus, the user need not be concerned with these initial settings when using system 10 to analyze a particular database. Preferably, however, the expert system-determined conditions may be overridden by the user through an API/user interface.

Preferably, expert system 51 provides any required domain knowledge and initial settings automatically without input from the user. Expert system 51 guides data reduction module 50 to select the most appropriate clustering function (e.g., based on the type or format of the database). Expert system 51 can also guide the module 50 to select more than one function and assign a particular order to the selected functions. Expert system 51 also initializes the selected functions where necessary. Preferably, expert system 51 incorporates predetermined heuristics to perform its tasks. For example, expert system 51 might select a minimum distance classifier function and initialize the function according to the heuristic "If the size of the database is greater than 50 fields times 1,000,000 records and rapid discovery is required, then use the minimum distance classifier, with the measure of closeness set at 5% for each numerical field."

Processor 12 also includes a noise reduction module 48. Noise reduction is the identification and elimination of data points that stray away from a body of knowledge within a particular domain. Typically, noisy data points are based on unusual and unrepeatable events, which do not occur with sufficient frequency to warrant having an effect on the solution being determined by system 10. Noise reduction module 48 preferably distinguishes chaos from noise. This may be accomplished based on thresholds set by the user or by expert system 51 or another expert system.

Preferably, noise reduction module 48 operates on both the cluster level and the point level. For example, clusters may be identified which have less than a predetermined number of points, particularly where the predetermined number is a relatively small percentage of the overall population of points. These clusters may be designated as noise and removed. Module 48 also identifies points within a given cluster that are significantly further from the cluster center than the other points within the cluster. These points may be designated as noise and removed from the cluster. Further, the cluster centers may be recalculated after the removal of noisy points.

Within data processor 32, system 10 also includes data analysis module 60. Preferably, data analysis module 60 automatically develops concepts based on the groups or clusters of data provided as a result of being passed through the data reduction module 50. Preferably, each cluster is analyzed by data analysis module 60 to generate at least one concept.

In general, cluster analysis provides a user with additional information regarding clusters generated by data reduction module 50. Data analysis module 60 performs such functions as measuring dispersion, confidence intervals, members, max/min/mean values, and other parameters to provide additional insight into the knowledge represented by each cluster.

Preferably, the center of each cluster is used to establish the nature of the knowledge discovered in terms of associations among the fields of the cluster. Attributes such as distribution, kurtosis, skewness, and the number of data points in a cluster are used to determine the relative confidence in the association knowledge represented by the cluster.

Preferably, each cluster is used to generate at least one concept and each concept is based on a cluster, representing a discrete component of knowledge automatically discovered by system 10. Concepts are essentially associations among domain parameters (e.g., fields) which occur with such frequency that they may be deemed as consistent and predictable patterns of events within the domain. Thus, each concept represents a correlation among the data of the domain in question. Each concept may be viewed as a "lesson learned" from the domain. The collection of all concepts represent the total body of knowledge discovered from the database.

Unlike rules, which require a fixed antecedent/consequence relationship, concepts are flexible, in a sense that any field may be part of the input or the output of a problem. Thus, each concept may be the basis of multiple rules or cases, individually composed to answer a specific question. Concepts may be first or higher order. First order concepts are derived from clusters on a one-to-one basis. With respect to first order concepts, the cluster represents the domain. Higher order concepts may be generated by combining other concepts in order to deduce new trends, patterns, and relationships which are otherwise unknown. With respect to higher order concepts, multiple clusters represent the domain. Therefore, correlations may be determined among data within one cluster, among data within multiple clusters, or among the clusters themselves.

The correlations determined by the data analysis module 60 may be used to provide a trend analysis. Events represented by data points may be associated with the appropriate time in which they occurred. Units of time may be in seconds, minutes, hours, days, weeks, months, seasons, years, etc. By grouping events according to their time stamp, trends of events may be observed. Conventional tools are limited in that they cannot perform this continuous analysis of the date/time domain. Instead, such tools consider time elements as discrete events (e.g., 3rd week, November, Year 2). With the continuous date/time analysis of the present invention, associations among events and specific times may also be discovered. Thus, temporal correlations/effects may be discovered. Temporal reasoning may be extended to the discovery of domain correlations of events, by sequencing events and investigating the events that lead to a certain effect. Pattern recognition is a higher order discovery of concepts. Through pattern recognition, repeatable sequences of events may be discovered, and used as a prediction tool.

Data analysis module 60 also provides a concept maintenance function. A user is provided with standard maintenance facilities for viewing, adding, changing, and deleting concepts. Both single and multiple concept views are preferably provided. Any new concepts added to the system may be representative of the current database configuration (e.g., they may be stated in terms of the currently selected database fields). Preferably, certain fields within the concept are available for changes after initial creation. Concepts may be deleted by the user at any time.

Data analysis module 60 also permits the user to merge clusters either manually or automatically. Manual cluster merging is preferably accomplished by selecting two or more clusters from a selection list and requesting that they be merged. The members of each cluster are combined and re-analyzed to provide information about the newly merged cluster. An automatic merge may be performed at a user's request after the user has had an opportunity to view the initial clusters formed by the system. This type of merge is preferably based on the amount of overlap and/or closeness among clusters. The user may supply one or more parameters indicating a threshold cluster overlap required for a merge. Alternatively, system 10 may autonomously merge clusters when spacial overlaps of a predetermined amount are detected. Autonomous merging of clusters is a disjunctive relationship discovery.

Preferably, processor 12 also includes an interview module 70, which allows a user to enter queries with respect to the data analysis and the correlations and concepts derived therefrom. The interview module 70 allows the user to query the data in different ways. For example, the interview module 70 is configured to allow the user to engage in data mining of the clusters, the parameters within clusters, the relationship of clusters, etc. Preferably, most data mining through interview module 70 is performed on the clusters themselves. This greatly reduces the amount of time and computational resources necessary to produce a response.

Interview module 70 of knowledge discovery system 10 preferably comprises an interface which permits the user to pose questions and review answers in various interactive or programmatic forms. In either case, a question is preferably composed using the selected database fields and their data ranges. An answer is preferably generated by comparing the question with the concepts generated by the data analysis module 60 of knowledge discovery system 10. The answer is formatted as an appropriate output.

The questions and answers may be presented in differing formats. According to one aspect, the interview function operates according to a process of deduction. In the deduction mode, answers are produced by starting with known parameters, and working toward the unknown. In this mode, specific knowledge is presented to the system (e.g., Temperature=67F, and Humidity=54RH), and specific answers are requested (e.g., What is the Defect?). Thus, a question may be represented as: "Specify Defect associated with Temperature=67 and Humidity=54." In this example Defect, Temperature and Humidity would be parameters based on the fields in the database. The numbers 67 and 54 are values of the respective fields. The remaining words are preferably selected based on a predefined natural language format. Multiple sentence structures allow for conjunction, data types, and the desired answer.

According to another aspect, the interview function operates according to a process of induction. In the induction mode, hypotheses are formed and support for the hypotheses is sought by the system. Therefore, the question format is one of specifying a hypothesis, which may or may not be verified. For example, a question may take the form: "Do most Defect=Run occur on Location=Decklid when Temperature=High and Humidity=Average?" Defect, Location, Temperature and Humidity would all correspond to fields in the database. Run, Decklid, High and Average are values for the respective fields. The remaining words are preferably selected based on a predefined natural language format. Again, there are preferably multiple sentence structures to allow for conjunction, data types, and the desired answer.

According to another aspect, the interview function operates according to a process of induction and deduction. This approach is useful when partial facts are known and used to conclude new states. An example of a result would be the discovery of an IF-THEN relationship.

According to a feature of the interview module 70, value ranges may be specified as part of the question or hypothesis. When specifying values (of any data type), the user is preferably permitted to specify various appropriate ranges, such as: data=a set value; data>a minimum value; data<a maximum value; data=a set value±a tolerance band; data= before date; data=after date; etc. Additionally, when formatting questions, the user may define data values for numeric fields in terms of the word associated with a range of values, such as Very Low, Low, Average, High, Very High, etc., rather than using an exact numeric value. For instance, these five sub-ranges might be formed by considering the entire range and dividing it into five segments. The division could be made according to a normal distribution or according to some other criteria, either autonomously or by user input.

Question formats also preferably include several Boolean operations. For example, the user may specify exceptions (e.g., by using a NOT operator) when composing questions. For example, a question might read: "Specify Defect when Color is NOT Red." Questions may be formatted using conjunction (e.g., AND operator). For example, a question might read: "Specify Defect associated with Temperature=67 AND Humidity=54." Questions may be formatted using disjunction (e.g., OR operator). For example, a question might read: "Under what conditions does Defect=Run OR Defect=Pop?"

The user is provided an opportunity to specify different output formats for the answers generated by autonomous knowledge discovery system 10. These formats include, for example, a Neutral Format Statement. In this format, a basic antecedent/consequence relationship is defined in a generic manner. For example, an answer may take the form: "Temperature=67+Humidity=54@Defect=Run"; where '@' is the separator between the first clause (antecedent) and the second clause (consequence). The semicolon indicates the end of the statement. This neutral format, when parsed, may be used by application developers to translate the outputs of system 10 into application-specific syntax (e.g., rules, cases, if/then logic, etc.).

Answer formats also preferably include a Natural Language Statement. This format also provides answers using an antecedent/consequence relationship. However, the answers are provided in a more English-like syntax rather than a formatted/encoded statement. This type of statement also uses units to provide additional information regarding the type of data contained in the field. There are at least two different natural language formats from which the user can choose. Under the Explicit format, explicit statements use exact data values and units when providing an answer to the user, as follows: "When color is red, temperature is 80 degrees, and humidity is 95%, the defect is sag." Under an implicit natural language format, implicit statements use classification ranges specified by the user rather than exact data values. For example: "When color is red, temperature is high, and humidity is very high, the defect is sag."

Classification ranges are preferably used within system 10 to define, by name, various ranges of data values within each numeric field (e.g., Very Low, Low, Average, High, Very High). The system 10 autonomously determines the initial values associated with each of the classification ranges for every numeric field selected in the database configuration process. This can be accomplished, for example, by an expert system, by using a normal distribution, or by incorporating predetermined criteria into system 10. Preferably, system 10 automatically assigns values to these ranges based on a normal distribution of the data values contained in the field. The user may change the data values associated with each range level. These ranges are then used in both posing questions and providing answers. Classification ranges can also be used by the data analysis module 60 in determining correlations or concepts.

Another aspect of the interview function is the application of field thresholds. The use of threshold levels within interview module 70 allows the user to exclude fields from being part of formatted answers based on each field's frequency of occurrence within the overall concept of a group or cluster of data. Frequency of occurrence is directly associated with the confidence factor assigned to each field within a concept.

For example, assume that a concept generated by data analysis module 60 specifies that a paint defect "Run" occurs on vehicles that are green, blue and red. Now assume that the frequency of occurrence associated with each of these colors within the concept is 60%, 35%, and 5% respectively. Also assume that the user has set the threshold value for the field color at 30%. In this instance, should the user pose a question asking what colors are associated with a defect of "Run," the system would return only green and blue. The color red would be excluded from the answer because it's frequency of occurrence was only 5% and the threshold is set at 30%.

Autonomous knowledge discovery system 10 also includes an application programming interface ("API") module 80. API module 80 provides access to all public functions within the knowledge discovery system 10. API module 80 operates according to standard API formats and may be used by any application developer to embed the knowledge discovery capabilities of system 10 within a specific application. API module 80 comprises callable executables. Thus, any language capable of remote procedure calls may access the API functions. An example of this would be a Visual Basic for Applications program written in Excel which uses the dynamic link libraries of system 10 for analysis of a spreadsheet.

Knowledge discovery system 10 also includes a standalone, full-featured, interactive user interface 82. User interface 82 uses API module 80 to enable a user to perform the data analysis functions of system 10. User interface 82 provides, among other things, a visualization function. Results from data analysis module 60 can be viewed according to a number of different formats. Various graphical and textual tools are used to better illustrate the data and the knowledge discovered. Among the visualization tools are: (1) tabular representation of the database (e.g., fields and records); (2) 2D or 3D-scattered graph of the numerical data points in the database; (3) bar chart representations of the aggregation of data in the database; and (4) 2D or 3D plots of the clusters. User interface 82 also provides a report function. Any suitable reporting mechanisms can be provided by system 10 including, for example, prints (e.g., printing of concepts, charts, graphs, and answers in any of the specified formats) and screen displays. Solutions provided by system 10 may be written to files including, for example, ASCII files. Results may be reported in spreadsheet form if desired. Other viewing and/or reporting techniques may be employed. Histograms and bar charts can be used to show distribution of data, for example, frequency analyses.

System 10 may be configured to operate in a client/server mode. In this mode, the user has access to a client version of the interactive interface on a local PC. This communicates via a network to a remote knowledge discovery system server that is responsible for processing data. This mode is especially suited for small databases which are uploaded to the server for maximum performance. However, remote calls to a database on the client machine may also be possible.

System 10 may be made available via remote requests for customers wishing to system 10 on a pay-per-use basis. In this scenario, users would provide a preprocessing file containing the various parameters required to run system 10. This file is preferably communicated to a knowledge discovery system server via a suitable communication medium. Request-driven processing, as opposed to real-time processing, occurs on the system server, and results are returned to the user after processing.

System 10 may provide various graphical user interfaces ("GUIs"). For example, a main screen may include eight main menu selections. Preferably, these are: File, Database, Discovery, Cluster, Concepts, Interview, Tools and Help. Every main menu item contains its own pull-down menu of related functions. System 10 may include more or fewer main menu selections.

Preferably, the File menu provides the user with standard file management functions including, New, Open, Save, Save As, Rename, Close, Exit and Report. The New function allows the user to create a new knowledge discovery session under a specific filename, and initializes the system application environment. The Open function opens an existing session based on a filename selected by the user. The Save function saves the current session based on a filename specified by the user. The Save As function allows the user to save the current session under a different name. The Rename function allows the user to rename the existing session. The Close function makes a backup version of the current session, reinitializes the application environment, and closes the active session. The Exit function makes a backup version of the current session, and exits the application. The Report function provides such sub-functions as Page Setup, Print Preview, Print and Mail. System 10 may have a File menu which includes more or fewer functions.

The Database menu provides all of the database interface functions associated with data processing, including Select, Query, View, Plot and Configure. The Select function allows the user to select the type of database to be processed, request a particular database by name, and ensure that the selections are valid. The Query function permits the user to perform various interviewing functions associated with interview module 70. The View function provides a table-like image for viewing database content prior to configuration of the data. The Plot function allows the user to plot the values contained in two numeric database fields on a d-scatter diagram. The Configure function, using the selected database as a starting point, directs the user through a series of selection/specification parameters that describe how data within the database will be used within the system. Users may first specify, through multiple selection list boxes, the specific fields and records (or the entire database) to be processed. For each selected field, the user may provide additional information such as data type, input format, output format, and units. System 10 may include a Database menu with more or fewer functions.

The Discovery menu provides access to certain functions once the user has configured the database for use in the knowledge discovery session. This menu allows the user to select one or more data reduction functions. Optionally, system 10 picks suitable data reduction functions automatically by using an expert system to pick the functions based on database architecture.

The Cluster menu provides access to information related to the clusters/aggregations that are formed during the correlation/data reduction process. This menu allows a user to select one or more functions including, for example, List, Visualization, Clean Up, Merge, Delete and Build Concepts. The menu may include more or fewer functions than these. The List function displays all of the clusters in the current session, and the attributes associated with each cluster. Cluster attributes may include such things as a list of members, measures of dispersion, minimum and maximum values, mean, etc. The Visualization function provides the user with a means to plot the cluster values for two numeric fields on a d.scatter diagram. The Clean Up function prompts the user to enter a cluster existence threshold, which is the minimum number of members required for a cluster to remain in existence. Preferably, a default cluster existence threshold is set to one. Upon validation of the user-entered threshold, the Clean Up function deletes any clusters that contain less than the threshold number specified. The Merge function merges clusters. Preferably, the Merge function includes an Automatic sub-function and a Manual sub-function. The Automatic sub-function merges clusters together based on distance. Thus, system 10 automatically determines the appropriate merge criteria. The Manual sub-function provides the user with a list of clusters from which the user may select any number to be merged. Thus, the user determines the appropriate merge criteria. The Delete function provides a selection list of all clusters from which the user may select any number of these to be deleted. The Build Concepts function causes system 10 to generate a concept for each cluster contained in the current session. System 10 accomplishes this through operation of data analysis module 60.

The Concepts menu includes several functions which enable the user to perform maintenance and queries on concepts. Functions under this menu include, for example, View, Add, Change, Delete, Save and Retrieve. The menu may include more or fewer functions than these. The View function displays all of the concepts in the current session, and the attributes associated with each cluster. Concept attributes include such things as value and weight of each database field value within the concept, creation date, time stamp etc. The Add function allows the user to add concepts to the system. Preferably, field specifications are limited to those available in the current configuration. The Change function allows the user to change some of the attributes connected to a concept (e.g., the value or weight associated with a particular field). The Delete function provides the user with a selection list of all concepts, from which the user may select any number to be deleted. The Save function provides the user with a selection list of all concepts, from which the user may select any number to be saved under a particular filename. The Retrieve function retrieves previously saved concepts based on a filename supplied by the user and brings these concepts into the current session environment.

The Interview menu includes such functions as Discovery, Deduction, Summary, Trend Analysis, Explanation—Explicit; Explanation—Implicit; Generate, Save and Retrieve. The menu may include more or fewer functions than these. The Discovery function prompts the system to display all of the discovered concepts. The Deduction function allows the user to pose questions and causes the system to respond by searching the concepts for an appropriate answer. The Summary function provides a statistical display of the discovered concepts. Trend Analysis categorizes discovered knowledge in a temporal sense, using date/time attributes. Explanation—Explicit provides responses to user questions in explicit form (e.g., using specific ranges and averages). Explanation—Implicit provides responses to user questions in implicit form (e.g., using fuzzy concepts such as "high" and "low"). The Generate function prompts the system to create an IF-THEN rule in response to a user question. Save allows the user to save output of concepts, rules, etc. to a file. Retrieve allows access to a file and the rules/concepts within the file.

The Tools menu includes such functions as Calculator, Notepad and Clear Desktop. Similar functions are available in other types of software applications. The Help menu includes standard help features, which are applied to the various commands and procedures encompassed within system 10.

It should be noted that the present invention is not limited to the specific examples provided above. Other subject matter can be represented by the data. Also, the data can exist in many other types of formats. Where data exists in records, any number of records may be contained in the database. Also, the records may have any number of fields. Moreover, the data need not necessarily exist in the form of records having fields. These are but a few of the variances in the database types and data types which can be used in connection with the present invention. Also, this example is not intended to demonstrate each and every aspect of the embodiments of the present invention, which have been described above.

The present invention has been described in connection with the preferred embodiments which are intended as examples only. It will be understood by those having ordinary skill in the pertinent art that modifications to the preferred embodiments may be easily made without materially departing from the scope and spirit of the present invention as defined by the appended claims.

What is claimed is:

1. A data analysis system, comprising:
   a database;
   a data interface coupled to the database for accessing data from the database;
   a cluster estimation tool for estimating a first number of clusters based on one or more characteristics of the database;

a data reduction module coupled to the data interface, the data reduction module comprising at least one data reduction function for reducing the data into at least one cluster based on the first number of clusters;

a data analysis module for analyzing the at least one cluster to determine a correlation among the data.

2. The system of claim 1, wherein the data analysis module autonomously analyzes the at least one cluster to autonomously determine the correlation among the data.

3. The system of claim 1, wherein the at least one data reduction function reduces the data into a plurality of clusters.

4. The system of claim 3, wherein the data analysis module analyzes the plurality of clusters to determine a correlation among the plurality of clusters.

5. The system of claim 1, wherein the cluster estimation tool autonomously estimates the first number of clusters.

6. The system of claim 1, further comprising a display device for displaying the correlation to a user.

7. The system of claim 6, wherein the correlation is displayed as a textual rule.

8. The system of claim 6, wherein the correlation is displayed as a tabular association.

9. The system of claim 1, wherein the at least one data reduction function comprises a genetic clustering function for reducing the data.

10. The system of claim 1, wherein the at least one data reduction function comprises a hierarchical valley formation function for reducing the data.

11. The system of claim 1, wherein the data reduction module uses a symbolic expansion reduction function to enable reduction of the data.

12. The system of claim 1, wherein the at least one data reduction function comprises a K-Means clustering function for reducing the data.

13. The system of claim 1, wherein the at least one data reduction function comprises a Kohonen neural network clustering function for reducing the data.

14. The system of claim 1, wherein the at least one data reduction function comprises a minimum distance classifier clustering function for reducing the data.

15. The system of claim 1, wherein the at least one data reduction function comprises a relational clustering function for reducing the data.

16. The system of claim 1, wherein the at least one data reduction function comprises a fuzzy case clustering function for reducing the data.

17. The system of claim 1, wherein the at least one data reduction function comprises a plurality of data reduction functions, the system further comprising an expert system to autonomously select one or more of the plurality of data reduction functions based on one or more characteristics of the database, the selected one or more data reduction functions being used by the data reduction module to reduce the data.

18. The system of claim 1, wherein the data analysis module determines a correlation between at least two of a plurality of parameters within the at least one cluster.

19. The system of claim 1, wherein the at least one cluster comprises data points, each data point being defined by at least one field, the correlation being based on a frequency of occurrence of the at least one field within the at least one cluster.

20. The system of claim 1, wherein the determination of the correlation is limited by at least one boundary condition.

21. The system of claim 20, further comprising an expert system for autonomously determining the at least one boundary condition based on predetermined heuristics.

22. The system of claim 20, further comprising an expert system for autonomously assigning a value to the at least one boundary condition based on predetermined heuristics.

23. The system of claim 1, wherein the at least one data reduction function comprises a clustering function, the clustering function defined by at least one initial condition set by a user.

24. The system of claim 1, wherein the at least one data reduction function comprises a clustering function defined by at least one initial condition, the system further comprising an expert system for autonomously establishing an initial value for the at least one initial condition based on predetermined heuristics.

25. The system of claim 1, further comprising an expert system coupled to the data analysis module for enabling the data analysis module to autonomously determine the correlation.

26. The system of claim 1, further comprising an interview module for accepting an input of at least one user-defined parameter from a user, the correlation being partially defined by the at least one user-defined parameter.

27. The system of claim 1, further comprising an interview module coupled to the data analysis module for performing a data mining function on the at least one cluster.

28. The system of claim 1, the database having a number of fields, wherein the cluster estimation tool estimates the first number of clusters based on a logarithmic relation to the number of fields.

29. The system of claim 1, the database having a number of records, wherein the cluster estimation tool estimates the first number of clusters based on a logarithmic relation to the number of records.

30. The system of claim 1, the database having at least one record, wherein the cluster estimation tool estimates the first number of clusters based on a logarithmic relation to a percentage sampling rate of the at least one record.

31. The system of claim 1, the database having a percentage of numerical data compared to a total amount of data in the database, wherein the cluster estimation tool estimates the first number of clusters based on a logarithmic relation to the percentage of numerical data.

32. The system of claim 1, the database having numerical data with an average granularity, wherein the cluster estimation tool estimates the first number of clusters based on a logarithmic relation to a percentage of the average granularity of the numerical data.

33. The system of claim 1, wherein the cluster estimation tool autonomously estimates the first number of clusters.

34. The system of claim 1, wherein the cluster estimation tool estimates the first number of clusters based on the equation $$CE = C \cdot \frac{\text{Log}(N)^{\text{Log}(F)} \cdot \text{Log}(PS) \cdot \text{Log}(PN)}{\text{Log}(PG+1)+1}$$

where CE is the estimated first number of clusters, C is a clustering constant, N is a number of records in the database, F is a number of fields in the database, PS is a percentage sampling rate of records in the database, PN is a percentage of overall data in the database which is in numerical form, and PG is a percentage of an average granularity of numerical data in the database.

35. The system of claim 1, wherein the at least one data reduction function autonomously reduces the data.

36. The system of claim 1, wherein the data reduction function reduces the data into the first number of clusters.

37. The system of claim 1, further comprising a cluster deviation function for determining a second number of clusters based on a number of empty clusters in an output from the data reduction function.

38. The system of claim 37, wherein if the number of empty clusters is one or more, the second number of clusters is equal to the first number of clusters less the number of empty clusters.

39. The system of claim 37, wherein if the number of empty clusters is zero, the second number of clusters is greater than the first number of clusters.

40. The system of claim 37, wherein the data reduction function reduces the data into the second number of clusters.

41. The system of claim 37, wherein the at least one cluster comprises the second number of clusters.

42. A method of determining a correlation among data of a database, comprising the steps of:

accessing the data;

estimating a first number of clusters based on one or more characteristics of the database by using a cluster estimation tool;

reducing the data into at least one cluster based on the first number of clusters; and determining a correlation among the data.

43. The method of claim 42, wherein the step of reducing the data comprises using an expert system to enable a data reduction function to reduce the data.

44. The method of claim 42, wherein the step of determining a correlation comprises using an expert system to enable autonomous determination of the correlation without input from a user.

45. The method of claim 42, wherein the step of determining a correlation comprises autonomously determining a correlation among the data.

46. The method of claim 42, wherein the at least one cluster comprises a plurality of clusters and wherein the step of determining a correlation comprises autonomously determining a correlation among the plurality of clusters.

47. The system of claims 42, wherein the step of reducing the data comprises reducing the data into the first number of clusters.

48. The method of claim 47 further comprising the step of determining a second number of clusters based on a number of empty clusters in an output from the step of reducing the data.

49. The method of claim 48 further comprising the step of further reducing the data into the second number of clusters.

50. A data analysis system comprising:

a database;

a cluster estimation tool for autonomously estimating a first number of clusters based on one or more characteristics of the database; and a data reduction module coupled to the database for autonomously reducing the data into the first number of clusters.

51. The system of claim 50, further comprising a cluster deviation function for determining a second number of clusters based on a number of empty clusters in an output from the data reduction function.

52. The system of claim 50, wherein the data reduction function further reduces the data into the second number of clusters.

53. A data analysis system comprising:

a database;

a cluster estimation tool for autonomously estimating a first number of clusters based on one or more characteristics of the database; and a data reduction module coupled to the database for reducing the data into the first number of clusters.

54. The system of claim 53, wherein the data reduction module comprises a genetic clustering function for reducing the data.

55. The system of claim 53, wherein the data reduction module comprises a hierarchical valley formation function for reducing the data.

56. The system of claim 53, wherein the data reduction module comprises a symbolic expansion reduction function for reducing the data.

57. The system of claim 53, wherein the data reduction module comprises a fuzzy case clustering function for reducing the data.

58. The system of claim 53, wherein the data reduction module comprises a relational clustering function for reducing the data.

59. The system of claim 53, further comprising a cluster deviation function for determining a second number of clusters based on a number of empty clusters in an output from the data reduction function.

60. The system of claim 53, wherein the data reduction function further reduces the data into the second number of clusters.

* * * * *